(12) United States Patent
Vilermo et al.

(10) Patent No.: US 9,788,119 B2
(45) Date of Patent: Oct. 10, 2017

(54) SPATIAL AUDIO APPARATUS

(71) Applicant: Nokia Technologies Oy, Espoo (FI)

(72) Inventors: Miikka Vilermo, Siuro (FI); Mikko Tammi, Tampere (FI); Joonas Nikunen, Kuopio (FI); Tuomas Virtanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 117 days.

(21) Appl. No.: 14/777,825

(22) PCT Filed: Mar. 20, 2013

(86) PCT No.: PCT/IB2013/052212
§ 371 (c)(1),
(2) Date: Sep. 17, 2015

(87) PCT Pub. No.: WO2014/147442
PCT Pub. Date: Sep. 25, 2014

(65) Prior Publication Data
US 2016/0073198 A1 Mar. 10, 2016

(51) Int. Cl.
*H04R 5/027* (2006.01)
*G10L 21/028* (2013.01)
(Continued)

(52) U.S. Cl.
CPC ............ *H04R 5/027* (2013.01); *G10L 21/028* (2013.01); *H04R 1/406* (2013.01); *H04R 3/005* (2013.01);
(Continued)

(58) Field of Classification Search
CPC combination set(s) only.
See application file for complete search history.

(56) References Cited

U.S. PATENT DOCUMENTS

2008/0227397 A1* 9/2008 Prasad ............... H04B 1/71055
455/63.1
2009/0012779 A1 1/2009 Ikeda et al.
(Continued)

FOREIGN PATENT DOCUMENTS

EP 1473964 11/2004
WO 2012061149 5/2012

OTHER PUBLICATIONS

Alexey Ozerov and Cedric Fevotte, Multichannel Nonnegative Matrix Factorization in Convolutive Mixtures for Audio Source Separation, IEEE Transactions on Audio, Speech, And Language Processing, vol. 18, No. 3, Mar. 2010, pp. 550-563.*
(Continued)

*Primary Examiner* — Duc Nguyen
*Assistant Examiner* — Assad Mohammed
(74) *Attorney, Agent, or Firm* — Nokia Technologies Oy

(57) ABSTRACT

An apparatus comprising: an input configured to receive at least two audio signals; a frequency domain transformer configured to transform the at least two audio signals into a frequency domain representation of the at least two signals; a spatial covariance processor configured to generate an observed spatial covariance matrix from the frequency domain representations of the at least two audio signals; a beamformer configured to generate a spatial covariance matrix model comprising at least one beamformer kernel; a matrix factorizer configured to generate a linear magnitude mode! of audio objects; to combine the spatial covariance matrix model and the linear magnitude model; and further configured to determine at least one combination parameter, such that the at least one parameter for the combination attempts to optimise the combination; and a separator configured to cluster the audio objects based on the at least one combination parameter to create separated audio sources.

24 Claims, 17 Drawing Sheets

(51) Int. Cl.
H04R 1/40 (2006.01)
H04R 3/00 (2006.01)
H04N 7/15 (2006.01)

(52) U.S. Cl.
CPC .......... H04N 7/15 (2013.01); H04R 2201/401 (2013.01); H04R 2430/23 (2013.01)

(56) References Cited

U.S. PATENT DOCUMENTS

| | | | |
|---|---|---|---|
| 2009/0055170 | A1 | 2/2009 | Nagahama |
| 2009/0164212 | A1 | 6/2009 | Chan et al. |
| 2011/0096915 | A1 | 4/2011 | Nemer |
| 2011/0123046 | A1 | 5/2011 | Hiroe |
| 2011/0142252 | A1 | 6/2011 | Morito et al. |
| 2012/0120218 | A1* | 5/2012 | Flaks .................... G10L 21/028 348/77 |

OTHER PUBLICATIONS

Emmanuel Vincent, Remi Gribonval, and Cedric Fevotte, Performance Measurement in Blind Audio Source Separation, IEEE Transactions on Audio, Speech, and Language Processing, vol. 14, No. 4, Jul. 2006, pp. 1462-1469.*

Ngoc Q. K. Duong, Emmanuel Vincent, Remi Gribonval, Under-Determined Reverberant Audio Source Separation Using a Fulll-Rank Spatial Covariance Model, IEEE Transactions on Audio, Speech, and Language Processing, vol. 18, No. 7, Sep. 2010, pp. 1830-1840.*

"Eigenmike Microphone", Mhacoustics, Retrieved on Nov. 17, 2016, Webpage available at: http://www.mhacoustics.com/mh_acoustics/Eigenmike_microphone_array.html.

Extended European Search Report received for corresponding European Patent Application No. 13878649.6, dated Nov. 15, 2016, 8 pages.

Duong et al."Under-Determined Reverberant Audio Source Separation Using a Full-Rank Spatial Covariance Model", IEEE Transactions on Audio, Speech and Language Processing, vol. 18, No. 7, Sep. 2010, pp. 1830-1840.

Ozerov et al."A General Flexible Framework for the Handling of Prior Information in Audio Source Separation",IEEE Transactions on Audio, Speech and Language Processing, vol. 20, No. 4, May 2012, pp. 1118-1133.

Duong et al., "Under-Determined Reverberant Audio Source Separation Using a Full-Rank Spatial Covariance Model", INRIA, Rapport De Recherche, Dec. 2009, 26 pages.

International Search Report and Written Opinion received for corresponding Patent Cooperation Treaty Application No. PCT/IB2013/052212, dated Mar. 6, 2014, 11 pages.

Steven J. Rennie et al. "Variational Probabilistic Speech Separation Using Microphone Arrays", IEEE Transactions on Audio, Speech and Language Processing, Jan. 1, 2007, IEEE Service Center, New York, NT, USA, ISSN 1558-7916.

Haohai Sun et al. "Optimal Higher Order Ambisonics Encoding With Predefined Constraints", IEEE Transactions on Audio, Speech and Language Processing, Jan. 1, 2007, IEEE Service Center, New York, NT, USA, ISSN 1558-7916.

* cited by examiner

SPATIAL AUDIO APPARATUS

RELATED APPLICATION

This application was originally filed as PCT Application No. PCT/IB2013/052212 filed Mar. 20, 2013.

FIELD

The present application relates to apparatus for spatial audio signal processing. The invention further relates to, but is not limited to, apparatus for spatial audio signal processing within mobile devices.

BACKGROUND

Spatial audio signals are being used in greater frequency to produce a more immersive audio experience. A stereo or multi-channel recording can be passed from the recording or capture apparatus to a listening apparatus and replayed using a suitable multi-channel output such as a multi-channel loudspeaker arrangement and with virtual surround processing a pair of stereo headphones or headset.

It would be understood that in the near future it will be possible for mobile apparatus such as mobile phone to have more than two microphones. This offers the possibility to record real multichannel audio. With advanced signal processing it is further possible to beamform or directionally process the audio signal from the microphones from a specific or desired direction by determining parameters such as direction associated with audio sources and processing the audio sources based on their directions.

SUMMARY

Aspects of this application thus provide a spatial audio capture and processing whereby listening orientation or video and audio capture orientation differences can be compensated for.

According to a first aspect there is provided a method for separating audio sources comprising: receiving at least two audio signals; transforming the at least two audio signals into a frequency domain representation of the at least two signals; generating an observed spatial covariance matrix from the frequency domain representations of the at least two audio signals; generating a spatial covariance matrix model comprising at least one beamformer kernel; generating a linear magnitude model of audio objects; combining the spatial covariance matrix model and the linear magnitude model; determining at least one combination parameter, such that the at least one parameter for the combination attempts to optimise the combination; and clustering the audio objects based on the at least one combination parameter to create separated audio sources.

Receiving the at least two audio signals may comprise at least one of: the audio signals being generated from microphones receiving acoustic waves from at least one audio source; and the audio signals being received from a memory, the audio signals describing acoustic waves from at least one audio source.

Transforming the at least two audio signals into a frequency domain representation of the at least two signals may comprise performing a time to frequency transform on the at least two audio signals.

Generating the observed spatial covariance matrix from the frequency domain representations of the at least two audio signals may comprise generating an observed spatial covariance matrix from an autocovariance of the two frequency domain representations.

The method may further comprise generating at least one beamformer kernel by generating time delays in a frequency domain of a set of look directions sampling the spatial space around the microphone array.

Generating at least one beamformer kernel may comprise generating an autocovariance of the time delays in the frequency domain of a set of look directions sampling the spatial space around the microphone array.

Generating a linear model of audio objects may comprise performing a non-negative matrix factorization for audio object magnitudes.

Performing a non-negative matrix factorization for audio object magnitudes may comprise initialising linear model parameters $z_{ko}$, $t_{ik}$ and $v_{kj}$ with random values uniformly distributed between zero and one;

Combining spatial covariance matrix model and the linear magnitude model, may comprise multiplying the spatial covariance matrix model by a magnitude envelope represented by the linear model.

Determining at least one combination parameter may comprise determining spatial covariance model parameters to minimize the difference between the observed spatial covariance matrix and the spatial covariance model.

Determining the spatial covariance model parameters may comprise performing an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

Performing the iterative optimization based on the complex value non-negative factorization may comprise: updating linear model parameters $z_{ko}$, $t_{ik}$ and $v_{kj}$ according to an optimization framework of complex non-negative matrix factorization; and updating the spatial covariance matrix model magnitudes.

Updating the spatial covariance matrix model magnitudes may comprise updating the relative magnitude difference of estimates of the at least two audio signals.

Clustering the audio objects based on the at least one combination model parameter to create separated audio sources may comprise generating at least one audio source from the at least one audio object and from the estimated linear magnitude model parameters.

The method may further comprise synthesising at least one audio signal based on the at least one combination model parameters associated with the at least one audio source.

According to a second aspect there is provided an apparatus comprising: means for receiving at least two audio signals; means for transforming the at least two audio signals into a frequency domain representation of the at least two signals; means for generating an observed spatial covariance matrix from the frequency domain representations of the at least two audio signals; means for generating a spatial covariance matrix model comprising at least one beamformer kernel; means for generating a linear magnitude model of audio objects; means for combining the spatial covariance matrix model and the linear magnitude model; means for determining at least one combination parameter, such that the at least one parameter for the combination attempts to optimise the combination; and means for clustering the audio objects based on the at least one combination parameter to create separated audio sources.

The means for receiving the at least two audio signals may comprise at least one of: the audio signals being generated from microphones receiving acoustic waves from at least one audio source; and the audio signals being received from a memory, the audio signals describing acoustic waves from at least one audio source.

The means for transforming the at least two audio signals into a frequency domain representation of the at least two signals may comprise means for performing a time to frequency transform on the at least two audio signals.

The means for generating the observed spatial covariance matrix from the frequency domain representations of the at least two audio signals may comprise generating an observed spatial covariance matrix from an autocovariance of the two frequency domain representations.

The apparatus may further comprise means for generating at least one beamformer kernel by generating time delays in a frequency domain of a set of look directions sampling the spatial space around the microphone array.

The means for generating at least one beamformer kernel may comprise generating an autocovariance of the time delays in the frequency domain of a set of look directions sampling the spatial space around the microphone array.

The means for generating a linear model of audio objects may comprise performing a non-negative matrix factorization for audio object magnitudes.

The means for performing a non-negative matrix factorization for audio object magnitudes may comprise means for initialising linear model parameters $z_{ko}$, $t_{ik}$ and $v_{kj}$ with random values uniformly distributed between zero and one;

The means for combining spatial covariance matrix model and the linear magnitude model may comprise means for multiplying the spatial covariance matrix model by a magnitude envelope represented by the linear model.

The means for determining at least one combination parameter may comprise determining spatial covariance model parameters to minimize the difference between the observed spatial covariance matrix and the spatial covariance model.

The means for determining the spatial covariance model parameters may comprise performing an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

The means for performing the iterative optimization based on the complex value non-negative factorization may comprise: means for updating linear model parameters $z_{ko}$, $t_{ik}$ and $v_{kj}$ according to an optimization framework of complex non-negative matrix factorization; and means for updating the spatial covariance matrix model magnitudes.

The means for updating the spatial covariance matrix model magnitudes may comprise means for updating the relative magnitude difference of estimates of the at least two audio signals.

The means for clustering the audio objects based on the at least one combination model parameter to create separated audio sources may comprise means for generating at least one audio source from the at least one audio object and from the estimated linear magnitude model parameters.

The apparatus may further comprise means for synthesising at least one audio signal based on the at least one combination model parameters associated with the at least one audio source.

According to a third aspect there is provided an apparatus comprising at least one processor and at least one memory including computer code for one or more programs, the at least one memory and the computer code configured to with the at least one processor cause the apparatus to at least: receive at least two audio signals; transform the at least two audio signals into a frequency domain representation of the at least two signals; generate an observed spatial covariance matrix from the frequency domain representations of the at least two audio signals; generate a spatial covariance matrix model comprising at least one beamformer kernel; generate a linear magnitude model of audio objects; combine the spatial covariance matrix model and the linear magnitude model; determine at least one combination parameter, such that the at least one parameter for the combination attempts to optimise the combination; and clustering the audio objects based on the at least one combination parameter to create separated audio sources.

Receiving the at least two audio signals may cause the apparatus perform at least one of; receive the audio signals being generated from microphones receiving acoustic waves from at least one audio source; and receive the audio signals from a memory, the audio signals describing acoustic waves from at least one audio source.

Transforming the at least two audio signals into a frequency domain representation of the at least two signals may cause the apparatus to perform a time to frequency transform on the at least two audio signals.

Generating the observed spatial covariance matrix from the frequency domain representations of the at least two audio signals may cause the apparatus to generate an observed spatial covariance matrix from an autocovariance of the two frequency domain representations.

The apparatus may further be causes to generate at least one beamformer kernel by generating time delays in a frequency domain of a set of look directions sampling the spatial space around the microphone array.

Generating at least one beamformer kernel may cause the apparatus to generate an autocovariance of the time delays in the frequency domain of a set of look directions sampling the spatial space around the microphone array.

Generating a linear model of audio objects may cause the apparatus to perform a non-negative matrix factorization for audio object magnitudes.

Performing a non-negative matrix factorization for audio object magnitudes may cause the apparatus to initialise linear model parameters $z_{ko}$, $t_{ik}$ and $v_{kj}$ with random values uniformly distributed between zero and one;

Combining spatial covariance matrix model and the linear magnitude model may cause the apparatus to multiply the spatial covariance matrix model by a magnitude envelope represented by the linear model.

Determining at least one combination parameter may cause the apparatus to determine spatial covariance model parameters to minimize the difference between the observed spatial covariance matrix and the spatial covariance model.

Determining the spatial covariance model parameters may cause the apparatus to perform an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

Performing the iterative optimization based on the complex value non-negative factorization may cause the apparatus to: update linear model parameters $z_{ko}$, $t_{ik}$ and $v_{kj}$ according to an optimization framework of complex non-negative matrix factorization; and update the spatial covariance matrix model magnitudes.

Updating the spatial covariance matrix model magnitudes may cause the apparatus to update the relative magnitude difference of estimates of the at least two audio signals.

Clustering the audio objects based on the at least one combination model parameter to create separated audio sources may cause the apparatus to generate at least one audio source from the at least one audio object and from the estimated linear magnitude model parameters.

The apparatus may further be caused to synthesise at least one audio signal based on the at least one combination model parameters associated with the at least one audio source.

According to a fourth aspect there is provided an apparatus comprising: an input configured to receive at least two audio signals; a frequency domain transformer configured to transform the at least two audio signals into a frequency domain representation of the at least two signals: a spatial covariance processor configured to generate an observed spatial covariance matrix from the frequency domain representations of the at least two audio signals; a beamformer configured to generate a spatial covariance matrix model comprising at least one beamformer kernel; a matrix factorizer configured to generate a linear magnitude model of audio objects; to combine the spatial covariance matrix model and the linear magnitude model; and further configured to determine at least one combination parameter, such that the at least one parameter for the combination attempts to optimise the combination; and a separator configured to cluster the audio objects based on the at least one combination parameter to create separated audio sources.

The input may comprise at least one of: at least one microphone input configured to receive the audio signals being generated from microphones receiving acoustic waves from at least one audio source; and at least one memory input configured to receive the audio signals from a memory, the audio signals describing acoustic waves from at least one audio source.

The frequency domain transformer may be configured to perform a time to frequency transform on the at least two audio signals.

The spatial covariance processor may be configured to generate an observed spatial covariance matrix from an autocovariance of the two frequency domain representations.

The beamformer may be configured to generate at least one beamformer kernel by generating time delays in a frequency domain of a set of look directions sampling the spatial space around the microphone array.

The beamformer may be configured to generate an autocovariance of the time delays in the frequency domain of a set of look directions sampling the spatial space around the microphone array.

The matrix factorizer may be configured to perform a non-negative matrix factorization for audio object magnitudes.

The matrix factorizer may be configured to initialise linear model parameters $z_{ko}$, $t_{ik}$ and $v_{kj}$ with random values uniformly distributed between zero and one;

The matrix factorizer configured to combine the spatial covariance matrix model and the linear magnitude model may be configured to multiply the spatial covariance matrix model by a magnitude envelope represented by the linear model.

The matrix factorizer configured to determining at least one combination parameter may be configured to determine spatial covariance model parameters to minimize the difference between the observed spatial covariance matrix and the spatial covariance model.

The matrix factorizer configured to determine the spatial covariance model parameters may be configured to perform an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

The matrix factorizer configured to perform the iterative optimization based on the complex value non-negative factorization may be configured to: update linear model parameters $z_{ko}$, $t_{ik}$ and $v_{kj}$ according to an optimization framework of complex non-negative matrix factorization; and update the spatial covariance matrix model magnitudes.

The matrix factorizer configured to update the spatial covariance matrix model magnitudes may be configured to update the relative magnitude difference of estimates of the at least two audio signals.

The separator configured to cluster the audio objects based on the at least one combination model parameter to create separated audio sources may be configured to generate at least one audio source from the at least one audio object and from the estimated linear magnitude model parameters.

The apparatus may further comprise a spatial synthesizer configured to synthesise at least one audio signal based on the at least one combination model parameters associated with the at least one audio source.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS

Figure 1:
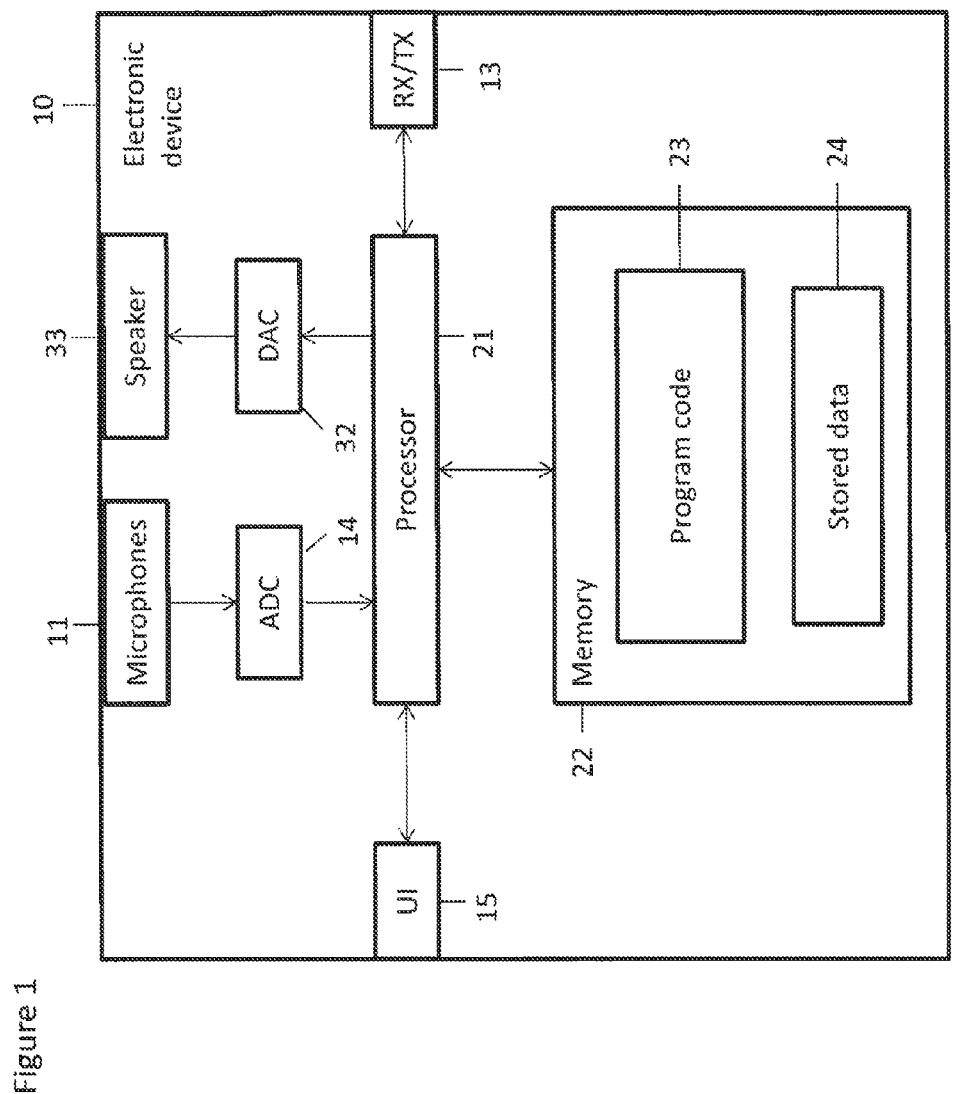
FIG. 1 shows schematically an apparatus suitable for being employed in some embodiments.

The following describes in further detail suitable apparatus and possible mechanisms for the provision of effective sound-field directional processing of audio recording for example within audio-video capture apparatus. In the following examples audio signals and processing is described. However it would be appreciated that in some embodiments the audio signal/audio capture and processing is a part of an audio-video system.

As described herein mobile devices or apparatus are more commonly being equipped with multiple microphone configurations or microphone arrays suitable for recording or capturing the audio environment or audio scene surrounding the mobile device or apparatus. A multiple microphone configuration enables the recording of stereo or surround sound signals and the known location and orientation of the microphones further enables the apparatus to process the captured or recorded audio signals from the microphones to perform spatial processing to emphasise or focus on the audio signals from a defined direction relative to other directions.

One way to perform spatial processing is to initially extract and manipulate the direction or sound source dependent information so to use this information in subsequent applications. These applications can include for example, spatial audio coding (SAC), 3D soundfield analysis and synthesis, sound source separation and speakers extraction for further processing such as speech recognition.

In general the field that studies such spatial sound processing is known as blind source separation (BSS) for simultaneously emitting sound sources. A classic example of such a case is known as the cocktail party problem enabling the separation of each individual speaker from the party recorded using a microphone array. The field of BSS has been intensively studied, but is still categorized as an unsolved problem. The capturing or recording apparatus or device usually consists of a small hand held device having multiple microphones. The multiple channels and their information correlation and relationship can then be utilized for source separation and direction of arrival estimation.

Furthermore applications employing such analysis, such as 3D soundfield analysis and synthesis can employ the accurate and detailed directional information of the separated sources when rendering the captured field by positioning the source using either binaural synthesis by head related transfer function (HRTF) filtering or source positioning in multichannel and multidimensional loudspeaker arrays using source positioning techniques such as vector base amplitude panning (VBAP).

Blind sound separation (BSS) of audio captures recorded using a small and enclosed microphone array such as conventionally found on a mobile device or apparatus can include the following problems and difficulties that are addressed herein by embodiments as described herein. Firstly the number of microphones is typically small, approximately 2-5 capsules, because of design volume and cost arrangements making the source direction of arrival (DoA) estimation difficult and pure beamforming based separation inefficient.

Beamforming for source direction of arrival detection and related problems and more recently spherical array beamforming techniques have been successfully used in sound field capture and analysis and also developed into final products such as Eigenmike. However the problem with spherical array processing is the array structure and the sheer size of the actual arrays used prevent it to be incorporated into a single mobile device. Furthermore pure beamforming does not address the problem of source separation but analyses the spatial space around the device with beams as narrow as possible. The sidelobe cancellation for decreasing the beam width generally requires increasing the microphone count of the array, which is as discussed costly in volume, device complexity and cost of manufacture.

Furthermore the small geometrical distance between capsules reduces the time-delay between microphones which require capturing using high sampling rate in order to observe the small time instance differences. When high sampling frequency is used there are problems with frequency domain based BSS methods in form of spatial aliasing. In other words audio frequencies with wavelength less than two times the distance of the microphone separation can cause ambiguity in resolving the time delays in form of a phase delay after a short time Fourier transform (STFT).

For example independent component analysis (ICA) can be applied in frequency domain to estimate statistically independent components at each frequency. The frequency-domain ICA leads to an arbitrary source ordering at each frequency. This permutation ambiguity has been solved by different means over the years, mixing filter frequency response smoothness, temporal structure of the source signals, and time-difference of arrival (TDoA) and direction of arrival (DoA), and interpretation of ICA mixing parameters. Furthermore there also exist ICA-based methods that avoid the permutation problem by unifying the source independencies across frequencies. However ICA based separation is one of the methods which is sensitive to problems caused by spatial abasing in permutation alignment and in unifying the source independencies over frequency.

Furthermore non-negative matrix factorization (NMF) based separation in multichannel cases has been proposed. These include for example multichannel NMF for convoluted mixtures, however the EM-algorithm used for parameter estimation is inefficient without oracle initialization, (in other words knowing source characteristics for initializing the algorithm). Complex multichannel NMF (CNMF) with multiplicative updates has been proposed with promising separation results. The proposed CNMF algorithms estimate the source spatial covariance properties and the magnitude model. However the spatial covariance matrices are estimated and updated individually for each frequency bin making the algorithm prone for estimation errors at high frequencies with spatial aliasing. Also the estimated covariance properties are not connected to the spatial locations of the sources.

In addition direct source magnitude envelope and spatial covariance matrix estimation has been proposed. The spatial properties are estimated frequency bin wise leading again into permutation ambiguity and with a separate algorithm for solving the component ordering, making it inefficient with high sampling rate captures.

Additionally the problem includes solving and executing 3D sound synthesis of the separated sources. It would further be understood that where spatial processing is performed with respect to spatial audio synthesis, such as 3D audio synthesis, the 3D synthesis of the separated sources or parts of the sources require pairing the separation algorithm with DoA analysis making the system potentially discontinuous and less efficient for the 3D sound scene analysis-synthesis loop. As such an enclosed microphone array with an unknown directivity pattern of each capsule requires a machine learning based algorithm for learning and compensating the unknown properties of the array.

Thus the concept as described herein in further detail is one which the audio recording system provides apparatus and/or methods for separating audio sources using several microphones in one device. In such embodiments sounds from different audio sources arrive at different times to the different microphones. Furthermore each audio source has individual spectral features. The concepts thus discuss herein that the apparatus and methods analyse microphone signals so as to determine a combination of the time-differences and spectral features. The effect of such embodiments is the sound sources that are separated from a mixture of audio sources.

In this regard reference is first made to FIG. 1 which shows a schematic block diagram of an exemplary apparatus or electronic device 10, which may be used to record for operate as a capture apparatus).

The electronic device 10 may for example be a mobile terminal or user equipment of a wireless communication system when functioning as the recording apparatus or listening apparatus. In some embodiments the apparatus can be an audio player or audio recorder, such as an MP3 player, a media recorder/player (also known as an MP4 player), or any suitable portable apparatus suitable for recording audio or audio/video camcorder/memory audio or video recorder.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal in other words not requiring an analogue-to-digital converter. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments where the microphones are 'integrated' microphones the microphones contain both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio-video subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

In some embodiments the apparatus audio-video subsystem comprises a camera 51 or image capturing means configured to supply to the processor 21 image data. In some embodiments the camera can be configured to supply multiple images over time to provide a video stream.

In some embodiments the apparatus audio-video subsystem comprises a display 52. The display or image display means can be configured to output visual images which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise only the audio capture and audio presentation parts of the audio subsystem such that in some embodiments of the apparatus the microphone (for audio capture) or the speaker (for audio presentation) are present. Similarly in some embodiments the apparatus 10 can comprise one or the other of the video capture and video presentation parts of the video subsystem such that in some embodiments the camera 51 (for video capture) or the display 52 (for video presentation) is present.

In some embodiments the apparatus 10 comprises a processor 21. The processor 21 is coupled to the audio-video subsystem and specifically in some examples the analogue-to-digital converter 14 for receiving digital signals representing audio signals from the microphone 11, the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example audio-video recording and audio-video presentation routines. In some embodiments the program codes can be configured to perform audio signal processing.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments as described herein comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, and a gyroscope or be determined by the motion of the apparatus using the positioning estimate.

It is to be understood again that the structure of the electronic device 10 could be supplemented and varied in many ways.

Figure 4:
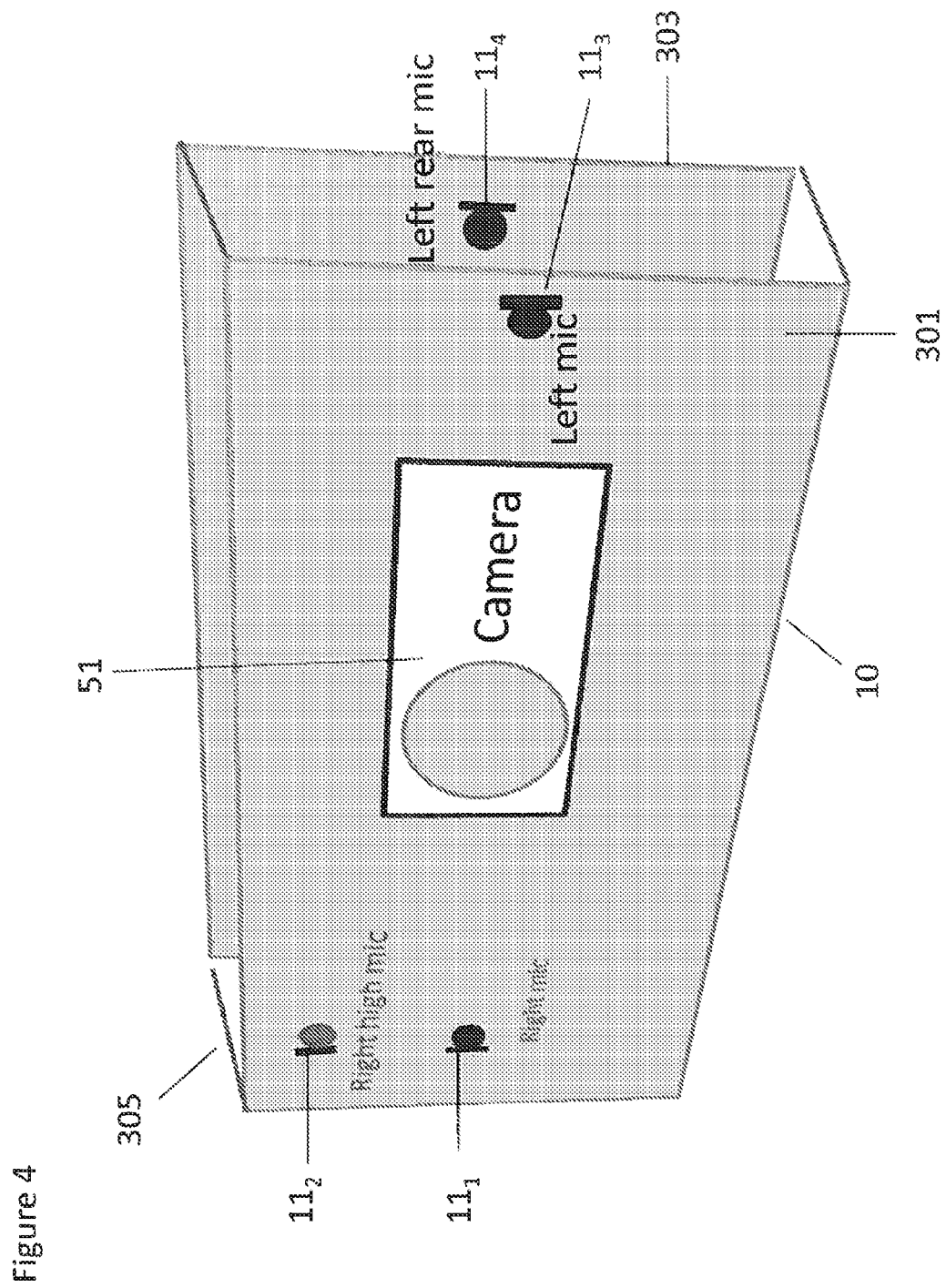
FIG. 4 shows schematically example microphone configurations on an apparatus according to some embodiments.

With respect to FIG. 4 an example apparatus implementation is shown wherein the apparatus 10 comprises a front face 301 comprising a camera 51, a rear face 303 and a top edge or face 305. In the example shown in FIG. 4 the apparatus comprises four microphones a first (front right) microphone $11_1$ located at the front right side of the apparatus where right is towards the top edge of the front face of the apparatus, a front left microphone $11_3$ located at the front left side of the apparatus, a right high microphone $11_2$ located at the top edge or face side of the apparatus, and a left rear microphone $11_4$ located at the left rear side of the apparatus.

Figure 2:
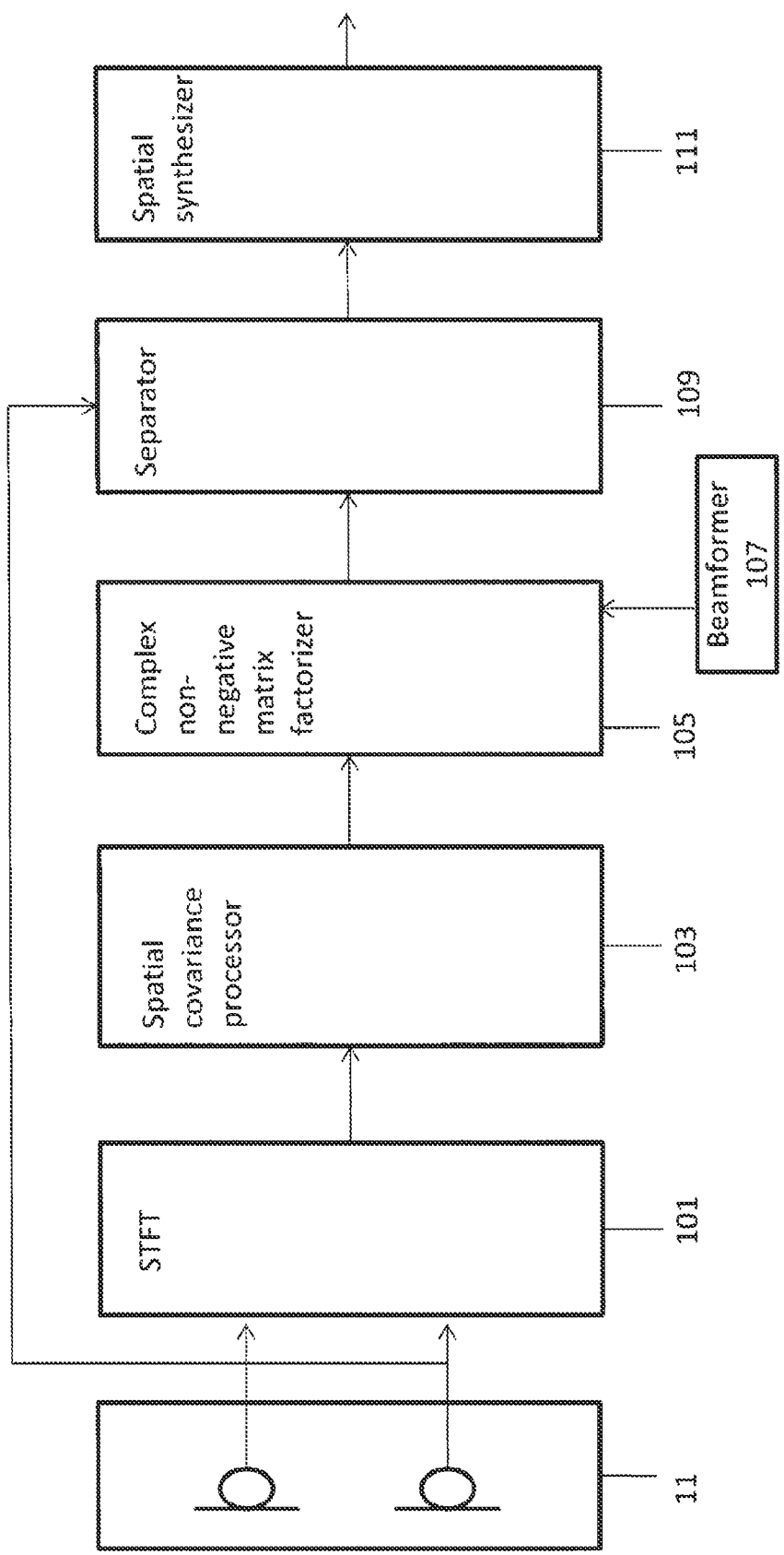
FIG. 2 shows schematically an example audio signal processing apparatus according to some embodiments.

With respect to FIG. 2, an example audio signal processing apparatus according to some embodiments is shown. Furthermore with respect to FIG. 3 a flow diagram of the operation of the audio signal processing apparatus as shown in FIG. 2 is shown.

In some embodiments the apparatus comprises the microphone or array of microphones configured to capture or record the acoustic waves and generate an audio signal for each microphone which is passed or input to the audio signal processing apparatus. As described herein in some embodiments the microphones 11 are configured to output an analogue signal which is converted into a digital format by the analogue to digital converter (ADC) 14. However the microphones shown in the example herein are integrated microphones configured to output a digital format signal directly to a short time Fourier transformer (SIFT) 101.

In the example shown herein there are four microphones these microphones can be arranged in some embodiments in a manner similar to that shown in FIG. 4. It would be understood that in some embodiments there can be more than or fewer than four microphones and the microphones can be arranged or located on the apparatus in any suitable manner.

Figure 3:
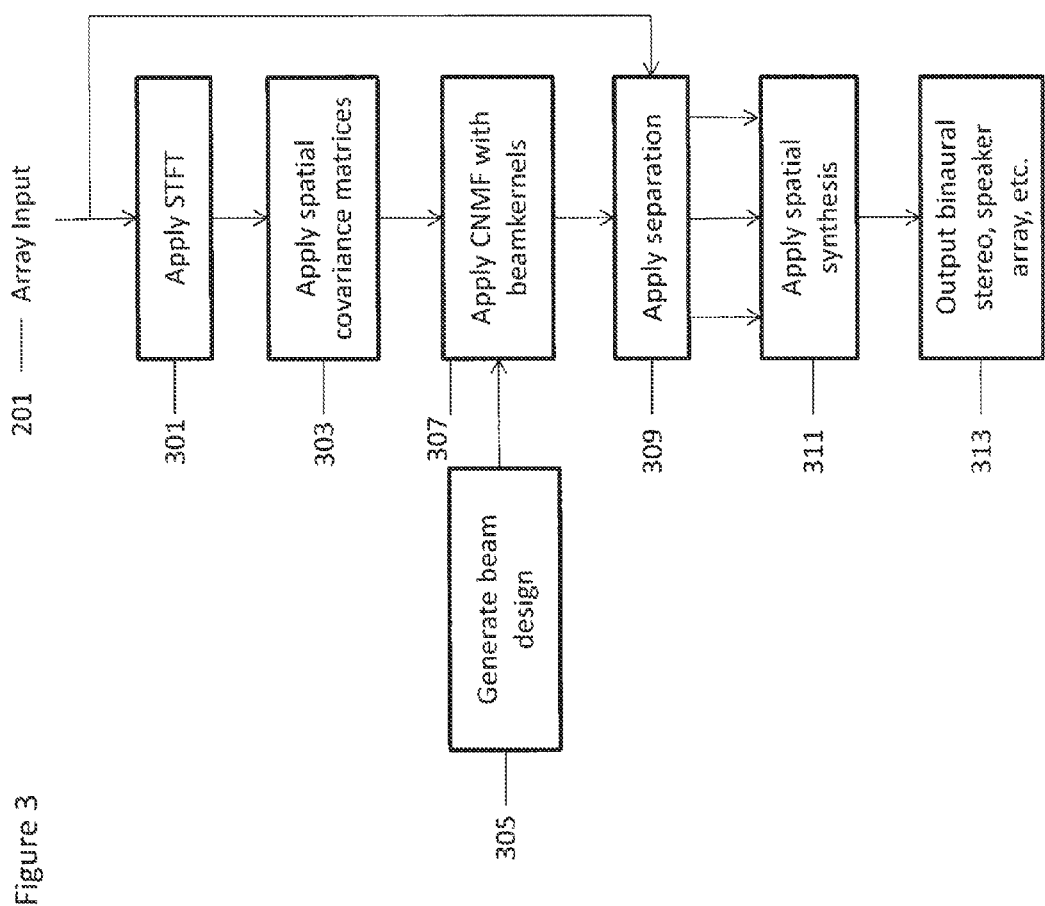
FIG. 3 shows schematically a flow diagram of the operation of the audio signal processing apparatus shown in FIG. 2 according to some embodiments.

Furthermore although as shown in FIG. 3 the microphones are part of the apparatus it would be understood that in some embodiments the microphone array is physically separate from the apparatus, for example the microphone array can be located on a headset (where the headset also has an associated video camera capturing the video images which can also be passed to the apparatus and processed in a manner to generate an encoded video signal which can incorporate the processed audio signals as described herein) which wirelessly or otherwise passes the audio signals to the apparatus for processing.

The microphone array can be considered to capture in the time domain the sound or audio sources which have been convolved with their spatial responses. This can be mathematically modelled or be described as:

$$\tilde{x}_m(t) = \sum_{k=1}^{K} \sum_{\tau} h_{mk}(\tau) s_k(t-\tau)$$

where $\tilde{x}_m(t)$ is the mixture of k=1 ... K sources captured by microphones m=1, ... M (in other words the microphone m receives the audio signal $\tilde{X}_m$. The sample index is denoted by t.

In this 'mixing' model the spatial response from the source k to the microphone m is denoted by $h_{mk(\tau)}$ and the source signals are given as $s_k(t)$.

The operation of receiving the microphone input audio signals is shown in FIG. 3 by step 201.

In some embodiments the apparatus comprises a short time Fourier transformer (STFT) 101. The short time Fourier transformer 101 is configured to perform a short time Fourier transform on the microphone input audio signals.

The 'mixing' model can be approximated in the STFT-domain as, $$x_{ij} = \sum_{k=1}^{K} h_{ijk} = \sum_{k=1}^{K} y_{ijk}$$

where $x_{ij}=[x_1, \ldots, x_M]^T \in \mathbb{C}^{1 \times M}$ is the short-time Fourier transform (SIFT) of the array capture $\tilde{x}_m(t)$, $i=1 \ldots I$ is the frequency index and $j=1 \ldots J$ is the frame index.

This STFT of a time domain signal can in some embodiments be obtained as follows, $$x_{ij} = \begin{bmatrix} x_1 \\ \vdots \\ x_M \end{bmatrix} = \begin{bmatrix} FFT[\tilde{x}_1(t)]_i \\ \vdots \\ FFT[\tilde{x}_M(t)]_i \end{bmatrix} \text{ where } t = (j-1)I+1, \ldots, jI$$

where the operator $FFT[\ldots]_i$ denotes ith frequency element of short time Fourier transformed input signal.

The operation of the STFT 101 on the array microphone signals and the model effectively replaced the spatial response $h_{mk(\tau)}$ with the frequency response denoted by $h_{ik}=[h_1, \ldots, h_M]^T \in \mathbb{C}^{M \times 1}$ and the STFTs of the sources $k=1 \ldots K$ are denoted by $s_{ijk}$. The single source signals as seen by the array, in other words the source signals convolved with their spatial impulse response are denoted by $y_{ijk}=h_{ik}s_{ijk}$. The spatial response filter $h_{mk(\tau)}$ has a length of several hundreds of milliseconds depending on the reverberation time of the capturing environment, but approximation of it by $h_{ik}$ in the frequency domain using an analysis window size of tens of milliseconds has been found to work well in practice due to the negligible energy after the main reverberant part of the source spatial response.

In some embodiments the STFT is configured to output the transformed domain signals to a spatial covariance processor 103.

The operation of applying a STFT to the time domain signals is shown in FIG. 3 by step 301.

In some embodiments the apparatus comprises a spatial covariance processor 103. The spatial covariance processor 103 is configured to receive the frequency domain form of the audio signals $x_{ij}=[x_1, \ldots, x_M]^T \in \mathbb{C}^{1 \times M}$ and perform a spatial covariance processing on them.

In order to avoid estimating and modelling the absolute phase of each channel the spatial covariance processor generates a spatial covariance matrix for each time-frequency point as the signal representation. In such embodiments the spatial covariance calculation translates the absolute phase to a phase delay between each microphone pair which is employed as a signal representation input for BSS algorithm described herein. In some embodiments the calculation of the SCMs determines a magnitude square-rooted version of the array capture. The determination of the magnitude square rooted version of the array capture ensures that the nonnegative part in the diagonal of the spatial covariance matrix (SCM), contains the STFT magnitudes.

In some embodiments an unmodified STFT of the capture array output can be used to produce a power spectrum on the diagonal of the SCM.

In the following example embodiments the magnitude square-rooted STFT is used as a starting point the SCMs for each time-frequency point derived by the following method.

In some embodiments the spatial covariance processor determines the magnitude square-rooted version of the capture array representation $x_{ij}=[x_1, \ldots, x_M]$ for a time-frequency point (i,j) as $$\dot{x}=[|x_1|^{1/2}\exp(i\arg(x_1)), \ldots, |x_M|^{1/2}\exp(i\arg(x_M))]^T = [|x_1|^{1/2}\text{sign}(x_1), \ldots, |x_M|^{1/2}\text{sign}(x_M)]^T,$$

where $\text{sign}(z)=z/|z|$ is the signum function for complex numbers.

Furthermore in some embodiments the spatial covariance processor 103 can be configured to determine the SCM for a single time-frequency point from the array capture vector $\hat{x}=[\hat{x}_1, \ldots, \hat{x}_M]^T$ as the outer product $$X=\hat{x}\hat{x}^H,$$

where H stands for Hermitian transpose.

The determined SCM $X \in \mathbb{C}^{M \times M}$ for a one time frequency point can be considered to consist of an observation magnitude $|x|=[|x_1|, \ldots, |x_M|]^T$ the diagonal $[X]_{nn}$ and the off-diagonal values $[X]_{nm}$, $n \neq m$ represent the magnitude and phase difference $|x_n x_m|^{1/2} \text{sign}(x_n x_m^*)$ between microphone pair (n, m).

In some embodiments the spatial covariance processor 103 can be configured to calculate the SCM for each time frequency point i, j and which can be denoted as the matrix with the following subindexing $X_{ij} \in \mathbb{C}^{M \times M}$.

The complex-valued monoaural source spectrogram $s_{ijk}$ in the SCM domain is equal to a real valued power spectrum $s_{ijk}\overline{s_{ijk}}$, where $\overline{c}$ denotes complex conjugate of complex number c. In some embodiments because of the square rooted STFT used to calculate SCMs hereafter the sources are denoted using their magnitude spectrum $\hat{s}_{ijk}=(s_{ijk}\overline{s_{ijk}})^{1/2}$.

It would be understood that by using the SCM representation of the microphone array audio signals defined by equations as defined above the absolute phase of the sources is not significant from the parameter estimation point of view and only the phase delay between all microphone pairs is modelled. Therefore the spatial covariance signal representation replaces the mixing vector $h_{ik}$ in the original model by mixing matrix $\hat{H}_{ik} \in \mathbb{C}^{M \times M}$ which denotes the source spatial response $h_{ik}$ expressed in the form of a covariance matrix $h_{ik}h_{ik}^H$. In this representation the mixing matrix is still defined for each STFT frequency bin i individually. In some embodiments and employing the above definitions the mixing model defined earlier can be expressed for the covariance observations as $$X_{i,j} \approx \sum_{k=1}^{K} S_{ijk} = \sum_{k=1}^{K} \hat{H}_{ik}\hat{s}_{ijk}$$

where $S_{ijk}=\hat{H}_{ik}\hat{s}_{ijk}$ is the source spatial covariance incorporating source magnitude details and the mixing.

In some embodiments the SCM of each source $s_{ijk}$ at each frequency can be modelled using a Hermitian positive semidefinite matrix $\hat{H}_{ik}$ approximating the true but unknown SCM. In such embodiments the mixture SCM and source magnitudes are only perceived and are yet to be estimated. Estimating the source magnitude details $\hat{s}_{ijk}$ and the corresponding mixing denoted by $\hat{H}_{ik}$ by turns in such embodiments could provide the desired BSS properties, however estimating $\hat{H}_{ik}$ in such a way that it corresponds to a single source over all frequencies is difficult in general. The spatial properties being individually estimated for each STFT frequency bin i does not utilize the fact that the covariance properties are connected by Time Difference of Arrival (TDoA) of the direct path and early reflections. The model in such embodiments relies on the fact that the Non-negative matrix factorization (NMF) model described herein in more detail enforces $\hat{s}_{ijk}$ to correspond to a single acoustical source and the phase delay evidence at each frequency i averaged over time yields to correct estimate of the true spatial properties.

In some embodiments the spatial covariance processor is configured to output the transformed SCM signals to a complex non-negative matrix factorizer 105.

The operation of generating a spatial covariance matrix form of the STFT is shown in FIG. 3 by step 303.

In some embodiments the apparatus comprises a beamformer generator 107. The beamformer is configured in some embodiments to generate at least one beamforming matrix for application to the spatial covariance matrix by the non-negative matrix factorizer 105.

In the source searching methods described herein modelling the source spatial response, such as independent component analysis (ICA) and complex valued non-negative matrix factorization (CNMF), the source parameters are estimated and optimized for each frequency bin independently. However in some embodiments as described herein in Direction of Arrival (DoA) estimation methods evidence across the whole frequency band is considered as whole. In DoA estimation approaches a single source position is linked to a single Time Difference of Arrival (TDoA) between the microphones assuming anechoic propagation or in case of reverberant conditions considering only its direct path propagation. The single TDoA unifies the phase delay over frequency making the DoA methods able to integrate evidence over all frequencies to obtain the estimate of DoA over the whole frequency spectrum making the source estimation more robust. However the application of the DoA concept has not been widely utilized in Blind Source Separation (BSS) parameter estimation due to difficulties in formulating the estimation algorithm and spatial aliasing that makes the process ambiguous.

In DoA analysis by beamforming, the TDoAs of certain spatial position are used for aligning the received signal and for searching for beam direction, in other words the source DoA, that produces the highest beamformer output energy. This is equivalent to making a hypothesis of all possible source positions and searching for TDoAs that give the time alignment of the microphone signals that generate the highest signal power when the aligned signals are summed together. A similar method can be used to unify STFT bin dependencies for estimating the source spatial response in any generic BSS method suffering from said problem of optimizing the model parameters individually regarding frequencies. The difference is merely that in BSS the optimization algorithm is set to fit a collection of TDoA kernels (which we call beamforming kernels in the following embodiments) to the observed data and that way finding the most likely DoA of the source in question.

Beamforming in its simplest form, delay and sum beamforming (DSBF), translates a given wavefront arrival direction into a set of TDoA values between each microphone pair. The TDoA values are derived from the geometric properties of the array and the process is described in further detail herein.

Figure 5:
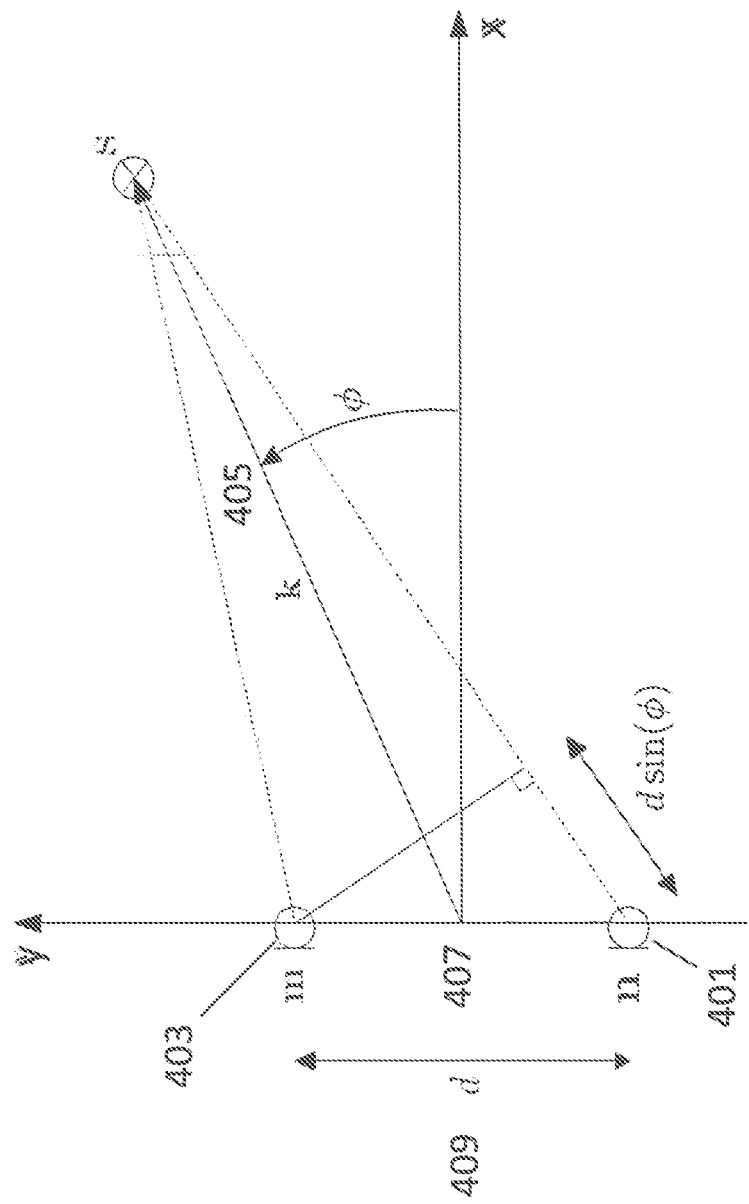
FIG. 5 shows example array geometry of an apparatus comprising two microphones.

For example FIG. 5 shows an example microphone array where one pair of microphones n 401 and m 403 lie on the xy-plane at locations n and m, respectively, and an unit vector k 405 is pointing towards the source from the geometrical center P 407 of the array. With respect to the following equations the direction vector k 405 is defined in Cartesian coordinates. For simplicity and in order to use a spherical coordinate system for denoting the source direction we define that the geometrical center of the array is in the origin of the Cartesian coordinate system, i.e. P=[0, 0, 0]. The source direction of arrival is hereafter given in the spherical coordinate system using elevation $\theta \in [0, \pi]$, azimuth $\phi \in [0, 2\pi]$ and radius r=1. If the DoA is given in degrees we define the following ranges $-90° \leq \theta \leq 90°$ and $0° \leq \phi \leq 360°$ for elevation and azimuth respectively. The reference axis of the array, zero elevation $\theta=0°$ and zero azimuth $\phi=0°$, can be arbitrarily set to point towards any direction in the spatial space.

By assuming a far field model for the source propagation and the wavefront being planar when arriving to the array we can write the TDoA of the microphone pair n m as $$\tau_{nm}(k) = \frac{k^T(n - m)}{v}$$

where v is the speed of sound. Each different source location denoted by k translates into one set of TDoAs which further translates into a phase delay proportional to the frequency in STFT domain. However the phase difference is unambiguous only up to frequency f=v/2d, where d 409 is the smallest distance between any two microphones in the array. Hereafter this point is referred to as the spatial aliasing frequency. The limitation originates from the fact that frequencies with half the wavelength shorter than the smallest microphone spacing d 409 cannot be discriminated by their phase difference.

The TDoA ($\tau_{nm}$) can be converted to a phase delay in the frequency domain as, $$W_{nm}(f,k) = \exp(j2\pi f \tau_{n,m}(k))$$

where k is a unit vector pointing to the desired look direction. Evaluating $W_{nm}$ for every pair n=1 . . . M and m=1 . . . M gives the beamforming kernels $W_{nm}$(f, k) into the look direction k we are interested in. The beamforming kernels can in some embodiments be output by the beamformer 107 to the complex non-negative matrix factorizer.

Figure 6:
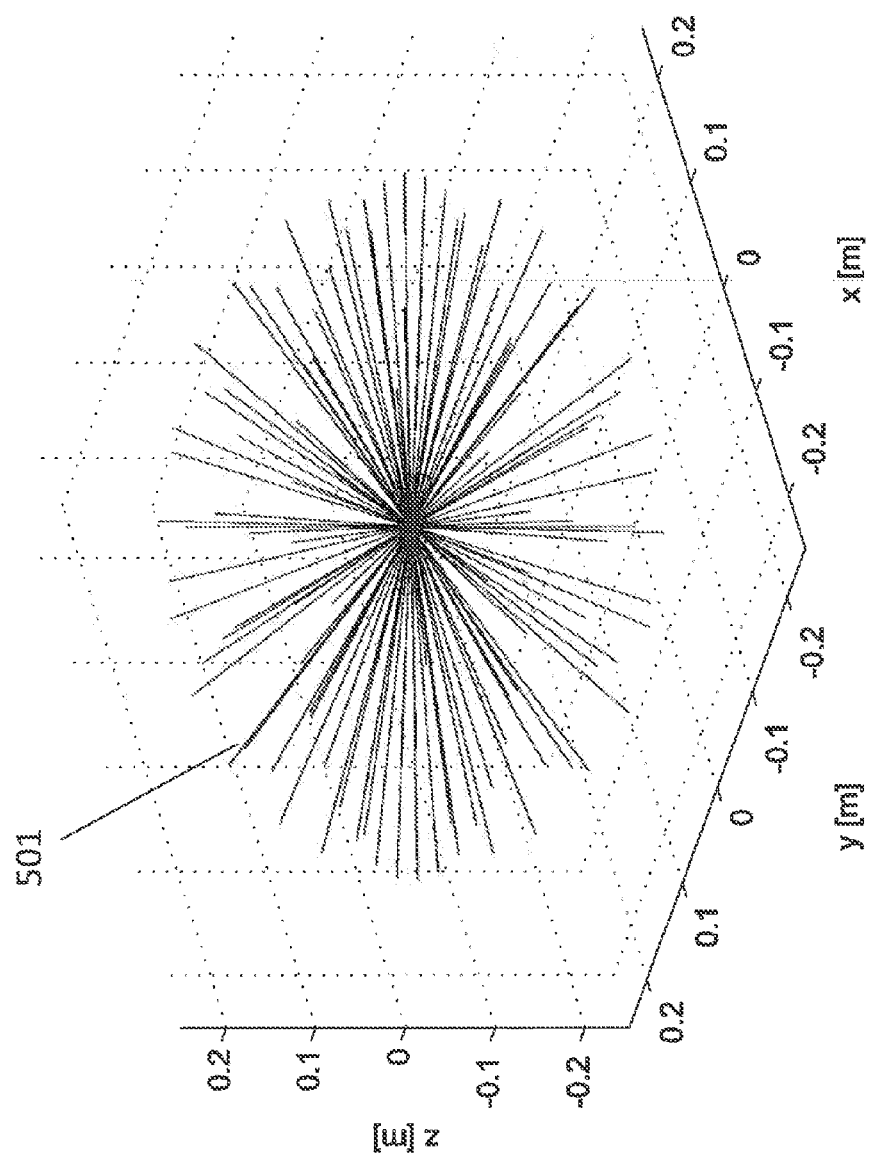
FIG. 6 shows example beam directions approximating uniform sampling of the unit sphere around the array.

In other words the beamformer 107 can be configured to define a set of look directions vectors, $k_o$ where o=1 . . . O, which spatially sample the surface of a unit sphere set around the geometrical center p of the array. An example of the look direction vectors 501 is illustrated in FIG. 6. These look directions 501 sample the spatial space around the microphone array. In some embodiments the beamforming kernels are denoted in each look direction at each frequency i=1 . . . 1 using $W_{io} \in \mathbb{C}^{M \times M}$ In other words entries $[W_{io}]_{nm}$ denote a TDoA in terms of phase difference expressed as complex number for a microphone pair (n, m). The kernels are obtained from the equation above as $$[W_{io}]_{nm} = W_{nm}(f, k_o) = \exp(j2\pi f \tau_{nm}(k_o)), \ f = \frac{iF_s}{N}$$

where $F_s$ is the sampling frequency and i is the SIFT frequency bin index in question and N is the SIFT window length.

The generating of the beamforming kernels is shown in FIG. 3 by step 305.

In some embodiments the apparatus comprises a complex non-negative matrix factorizer 105. The complex non-negative matrix factorizer 105 is configured to receive the beamforming kernels from the beamformer and apply these to the spatial covariance matrix form of the received audio signals. The proposed complex valued non-negative matrix factorization (CNMF) model employed in some embodiments as described herein comprises a non-negative matrix factorization (NMF) magnitude model core for modelling the source STFT magnitude details denoted by $\hat{s}_{ijk}$. In practice several non-negative matrix factorization (NMF) components are used for representing one acoustical sound source however in the examples described herein one NMF component represents one sound source. This simplification enables a more intuitive explanation of the spatial covariance matrix (SCM) model of the audio signals.

The source spatial covariance defined as $s_{ijk} = \hat{H}_{ik} \hat{s}_{ijk}$ and the SCM model that comprises of weighted superposition of multiple DSBFs can be defined as, $$\hat{H}_{ik} = \sum_{o=1}^{O} W_{io} z_{ko}$$

where $z_{ko}$ are the directional weights corresponding to the beamforming kernels into each look direction and $\hat{H}_{ik}$ models the source spatial response $h_{ik}$ expressed in the form of covariance matrix $h_{ik} h_{ik}^H$. In the embodiments described herein the complex non-negative matrix factorizer 105 is configured to estimate $\hat{H}_{ik}$ in such way that they correspond to a single acoustical source, this is achieved in the embodiments described herein by estimating spatial weights $z_{ko}$ that are independent of frequency. The definition of the DSBF kernels by the beamformer takes into account the frequency dependencies that the DoA of a certain source in form of TDoA causes. The spatial weights $z_{ko}$ are furthermore restricted to be positive.

In some embodiments the complex non-negative matrix factorizer 105, given the SCM model attempts to minimize the squared Euclidean distance $\|X_{ij} - \hat{X}_{ij}\|_F^2$ between the observations $X_{ij}$ and the signal model $\hat{X}_{ij}$. In some embodiments the complex non-negative matrix factorizer 105 therefore given the SCM model uses a source model for covariance observations as $$X_{ij} \approx \hat{X}_{ij} = \sum_{k=1}^{K} \hat{H}_{ik} \hat{s}_{ijk} = \sum_{k=1}^{K} \sum_{o=1}^{O} W_{io} z_{ko} \hat{s}_{ijk}.$$

The CNMF parameter structure for estimating and factorizing $\hat{s}_{ijk}$ is explained further herein. However given a DoA based interpretation of $\hat{H}_{ik}$ with direction dependent weights $z_{ko}$ it is possible to formulate the model in such a way that magnitudes $\hat{s}_{ijk}$ correspond to a single real acoustical source.

For example each source $\hat{s}_{ijk}$ can be modelled such that each source has a SCM defined according to, $$\hat{H}_{ik} = \sum_{o=1}^{O} W_{io} z_{ko}$$

which determines its spatial position.

The non-negative matrix factorization (NMF) model for the magnitude spectrogram of single source can thus be written as $\hat{s}_{ijk} = t_{ik} v_{kj}$, and single channel mixture of the sources is defined as $$\sum_{k}^{K} \hat{s}_{ijk} = \sum_{k}^{K} t_{ik} v_{kj},$$

where k is the source index and K is the total number of sources used for modelling and approximating the observed magnitude spectrogram matrix. Each column vector $t_{i,k}$ contains the DFT spectrum of a source, and the corresponding row of $v_{kj}$ represents its time-varying gain in each SIFT frame.

In some embodiments the scaling of DSBF kernels is restricted to $\|W_{io}\|_F = 1$, where $\|\ldots\|_F$ denotes frobenius norm for matrices. The scaling ensures that the SCM part is only responsible of modelling the phase delay and relative magnitude differences between input channels (diagonal values). Substituting the NMF model into the covariance model and rearranging the parameters generates the whole CNMF model, $$X_{ij} = x_{ij} x_{ij}^H \approx \hat{X}_{ij} = \sum_{k=1}^{K} \sum_{o=1}^{O} W_{io} z_{ko} t_{ik} v_{kj},$$

where $W_{io}$ are the beamforming kernels, $z_{ko}$ are the kernel weights for source k, i.e. directional weights.

In some embodiments the CNMF model can be generated using the source SCM by incorporating the single channel source magnitudes $t_{ik} v_{kj}$ which generates the following model, $$\hat{X}_{ij} = \sum_{k=1}^{K} \hat{H}_{ik} t_{ik} v_{kj},$$

from where it is understood that real value entries in the diagonal of $|\hat{H}_{ik}|$ are responsible for modelling the absolute source magnitude level with respect to each channel and the off-diagonal values model the cross-channel magnitude and phase difference properties. The spatial covariance matrix obtained further means that the magnitudes $|W_{io}|$ combined with the non-negative weights $z_{ko}$ eventually determine the multichannel magnitude model.

The delay and sum beamformer (DSBF) steering matrices generated by the beamformer produce unit magnitude for all values. To model the magnitude differences between each channel the complex non-negative matrix factorizer 105 is configured to estimate and update magnitudes of $W_{io}$ accordingly. This is because the sources are captured with varying gain with respect to each microphone, which is further caused by microphones having a different distance from the source and the possible acoustic shade of the device producing directional dependent gain even if omnidirectional microphones are used. While the spatial covariance matrix magnitudes are subject to optimization, the complex non-negative matrix factorizer 105 in some embodiments keeps the original beamforming phase difference the same. In other words the original phase shift caused by a certain direction of the source. In this way the dependency between different frequency components is retained when modelling the phase difference by only estimating the frequency independent spatial weights $z_{ko}$.

In some embodiments the complex non-negative matrix factorizer 105 is configured to employ multiplicative updates for iteratively deriving the NMF decomposition parameters minimize a given cost function, for example squared Euclidean distance or Kullback-Leibler divergence. The multiplicative updates can be obtained from the partial derivatives of the cost function with respect to each estimated parameter.

However in some embodiments the complex non-negative matrix factorizer 105 is configured to obtain the updates via auxiliary functions and Expectation Maximization (EM) algorithm structure. The statistical interpretation of different NMF cost functions has been discussed in the art. It has been shown that the multiplicative algorithm updates for optimizing the algorithm parameters is equivalent to the maximum likelihood estimation of mean or variance of a suitable probability distribution. In case of a squared Euclidean distance the parameter optimization equals to the maximum likelihood estimation of the mean of a Gaussian distribution with a fixed variance.

In order to use the EM-algorithm structure in the maximum likelihood estimation of model parameters we redefine the model with the following statistical interpretation $$X_{ij} \sim \mathcal{N}_c\left(X_{ij} \middle| \sum_{k=1}^{K} \sum_{o=1}^{O} W_{io} z_{ko} t_{ik} v_{kj}, \sigma^2 \right)$$

where $\mathcal{N}_c$ denotes complex Gaussian distribution. The Gaussian distribution matrix notation $\mathcal{N}_c(X|Y, \sigma^2)$ denotes the distribution mean using' and the variance for each matrix entry is denoted using $\sigma^2$. This statistical interpretation converts squared a Frobenius norm $\|X_{ij}-\hat{X}_{ij}\|_F^2$ used for measuring the modelling error into a maximum likelihood estimation of the mean of the Gaussian distribution with a fixed variance $\sigma^2$. The CNMF model for the observed spatial covariance matrix x in a single time-frequency point (i, j) can be given as following posterior distribution $$p\left(X_{ij}|\theta\right) = \prod_{n=1}^{M} \prod_{m=1}^{M} \mathcal{N}_c([X_{ij}]_{nm}|\sum_{k=1}^{K}\sum_{o=1}^{O}[W_{io}]_{nm} z_{ko} t_{ik} v_{kj}, 1) \propto$$

$$\exp\left(-\left\|X_{ij} - \sum_{k=1}^{K}\sum_{o=1}^{O} W_{io} z_{ko} t_{ik} v_{kj}\right\|_F^2\right)$$

where $\theta=\{W, Z, T, V\}$ represents the parameters of the proposed CNMF model, $\mathcal{N}_c$ denotes complex Gaussian distribution and $\|\ldots\|_F$ denotes Frobenius norm for matrices, in some embodiments the complex non-negative matrix factorizer 105 derivation of the update rules write the total likelihood over all time-frequency points as, $$p(X|\theta) \propto \prod_{i=1}^{I} \prod_{j=1}^{J} \exp\left(-\left\|X_{ij} - \sum_{k=1}^{K}\sum_{o=1}^{O} W_{io} z_{ko} t_{ik} v_{kj}\right\|_F^2\right)$$

In order to estimate the posterior distribution parameters and optimize the model parameters the complex non-negative matrix factorizer 106 can determine the negative log-likelihood of $p(X/\theta)$ which results in the following, $$\mathcal{L}(W, Z, T, V) = \sum_{i=1}^{I} \sum_{j=1}^{J} \left\|X_{ij} - \sum_{k=1}^{K}\sum_{o=1}^{O} W_{io} z_{ko} t_{ik} v_{kj}\right\|_F^2,$$

The complex non-negative matrix factorizer 105, by minimizing the above defined negative log-likelihood obtains the model parameters $\theta=\{W, Z, T, V\}$ that maximize the likelihood of the posterior distribution given observations X.

In some embodiments the complex non-negative matrix factorizer 105 can be configured to introduce unknown underlying components $C_{ijko}$, assumed to be mutually independent and modelled by individual Gaussian distributions. The latent components $C_{ijko}$ denote the spatial covariance of an unknown gaussian variable. These latent components are defined such that, $$\sum_{k=1}^{K} \sum_{o=1}^{O} C_{ijko} = X_{ij}.$$

Based on the summation property of Gaussian variables the variance of each of these latent variables is 1/K where K is the total number of sources. Furthermore the total likelihood with the latent components can be written as $$\mathcal{L}^+(W, Z, T, VC) = \sum_{i=1}^{I} \sum_{j=1}^{J} \sum_{k=1}^{K} \sum_{o=1}^{O} \frac{1}{\tau_{ijko}} \left\|C_{ijko} - W_{io} z_{ko} t_{ik} v_{kj}\right\|_F^2$$

where the variance of the Gaussian variables are now addressed using parameter $\tau_{ijko}$ which satisfies $\Sigma_{k,k,o}\tau_{ijko}=1$ and $\tau_{ijko}>0$. The total likelihood of $\mathcal{L}^+$ can be used for an indirect optimization of $\mathcal{L}(W, Z, T, V)$. This is due the likelihood of the auxiliary function having the following properties $$\mathcal{L}(W, Z, T, V) \leq \mathcal{L}^+(W, Z, T, VC)$$

$$\mathcal{L}(W, Z, T, V) = \min_{C} \mathcal{L}^+(W, Z, T, VC)$$

which indicates that minimizing $\mathcal{L}^+$ with respect to C, T and V corresponds to the minimization of $\mathcal{L}$ and the maximum likelihood estimation of $p(X/\theta)$.

In some embodiments the complex non-negative matrix factorizer 105 can define the auxiliary function as:

$$C_{ijko} = W_{io} z_{ko} t_{ik} v_{kj} + r_{ijko}\left(X_{ij} - \sum_{k,o} W_{io} z_{ko} t_{ik} v_{kj}\right),$$

which substituted into equation $\mathcal{L}^+(W, Z, T, V C)$ makes it equal to L(W, Z, T, V) and again allows indirect minimization of the whole model using the auxiliary variables and their likelihood. For the variance parameters Sawada et. al, derives following definitions $$r_{ijko} = \frac{z_{ko} t_{ik} v_{kj}}{\hat{x}_{ij}},$$

$$\hat{x}_{ij} = \sum_{k,o} z_{ko} t_{ik} v_{kj}$$

which equals to assigning the variance to the latent components in proportion to the magnitude of the component divided by the whole model magnitude level.

In some embodiments the complex non-negative matrix factorizer 105 additionally introduces the following constraints for numerical stability and to fix the scaling between parameters, $$\sum_{o=1}^{O} z_{ko}^2 = 1,$$

$$\sum_{j=1}^{J} v_{kj}^2 = 1,$$

$$\|W_{io}\|_F = 1.$$

The scaling of $z_{ko}$ to unity $l^2$-norm along DSBF kernel direction dimension is compensated by multiplying $t_{ik}$ by the same norm. Similarly enforcing unity $l^2$-norm to $v_{kj}$ is compensated by scaling of $t_{ik}$. The beam kernel covariance matrices are scaled to unity Frobenius norm to prevent them changing the overall magnitude level of the model. The proposed scaling is achieved by applying the following, $$v_{kj} \leftarrow \frac{v_{kj}}{\sum_{j=1}^{J} v_{kj}^2},$$

$$t_{ik} \leftarrow \frac{t_{ik}}{\sum_{j=1}^{J} v_{kj}^2},$$

$$z_{ko} \leftarrow \frac{z_{ko}}{\sum_{o=1}^{O} z_{ko}^2},$$

$$t_{ik} \leftarrow \frac{t_{ik}}{\sum_{o=1}^{O} z_{ko}^2},$$

$$W_{io} \leftarrow \frac{W_{io}}{\|W_{io}\|_F}.$$

in some embodiments the complex non-negative matrix factorizer 105 applies a partial derivation of $\mathcal{L}^+(W, Z, T, V\ C)$ with respect to each model parameter and setting the derivative to zero. For the derivation of $z_{ko}$, $t_{ik}$ and $v_{kj}$ the complex non-negative matrix factorizer 105 can redefine the likelihood function $\mathcal{L}^+(W, Z, T, V\ C)$ by expanding the Frobenius form into the following form $$\mathcal{L}^+(\theta) = \sum_{i,j,k,o} \frac{1}{r_{ijko}} [\|C_{ijko}\|_F^2 + \|W_{io}\|_F^2 z_{ko}^2 t_{ik}^2 v_{kj}^2 - 2 z_{ko} t_{ik} v_{kj} tr(C_{ijko} W_{io})]$$

using the equality $\|A\| = tr(A^H A)$. Also based on the scaling the second term simplifies to $z_{ko}^2 t_{ik}^2 v_{kj}^2$.

The partial derivatives of $L^+(\theta)$ with respect to parameters $z_{ko}$, $t_{ik}$ and $v_{kj}$ can be given as, $$\frac{\partial \mathcal{L}^+(\theta)}{\partial z_{ko}} = \sum_{i,j} \frac{2}{r_{ijko}} [z_{ko} t_{ik}^2 v_{kj}^2 - t_{ik} v_{kj} tr(C_{ijko} W_{io})]$$

$$\frac{\partial \mathcal{L}^+(\theta)}{\partial t_{ik}} = \sum_{j,o} \frac{2}{r_{ijko}} [z_{ko} t_{ik} v_{kj}^2 - z_{ko} v_{kj} tr(C_{ijko} W_{io})]$$

$$\frac{\partial \mathcal{L}^+(\theta)}{\partial v_{kj}} = \sum_{i,o} \frac{2}{r_{ijko}} [z_{ko}^2 t_{ik}^2 v_{kj} - z_{ko} t_{ik} tr(C_{ijko} W_{io})]$$

where $\theta = \{W, Z, T, V\ C\}$, Setting the derivatives to zero, substituting $\tau_{ijko}$ with its definition by Sawada of al and solving the equation with respect to the parameter to be updated determines the following update rules $$z_{ko} \leftarrow \frac{\sum_{i,j} \hat{x}_{ij} tr(C_{ijko} W_{io})}{\sum_{i,j} t_{ik} v_{kj} \hat{x}_{ij}}$$

$$t_{ik} \leftarrow \frac{\sum_{j,o} \hat{x}_{ij} tr(C_{ijko} W_{io})}{\sum_{j,o} z_{ko} v_{kj} \hat{x}_{ij}}$$

$$v_{kj} \leftarrow \frac{\sum_{i,o} \hat{x}_{ij} tr(C_{ijko} W_{io})}{\sum_{i,j} z_{ko} t_{ik} \hat{x}_{ij}}.$$

It would be understood that the above updates are not in a multiplicative form that is desired for fast and reliable algorithm convergence. However the above updates can be brought into a multiplicative form with following equality, $$\hat{x}_{ij} tr(C_{ijko} W_{io}) = z_{ko} t_{ik} v_{kj} (\hat{x}_{ij} + tr(E_{ij} W_{io}))$$

where $E_{ij} = X_{ij} - \Sigma_{k,o} W_{io} z_{ko} t_{ik} v_{kj}$ is the error of the model. Pacing $\hat{x}_{ij} tr(C_{ijko} W_{io}) = z_{ko} t_{ik} v_{kj} (\hat{x}_{ij} + tr(E_{ij} W_{io}))$ back into the update rules determined above and after few manipulations generates the following multiplicative updates, $$z_{ko} \leftarrow z_{ko} \left[ 1 + \frac{\sum_{i,j} t_{ik} v_{kj} tr(E_{ij} W_{io})}{\sum_{i,j} t_{ik} v_{kj} \hat{x}_{ij}} \right]$$

$$t_{ik} \leftarrow t_{ik} \left[ 1 + \frac{\sum_{j,o} z_{ko} v_{kj} tr(E_{ij} W_{io})}{\sum_{j,o} z_{ko} v_{kj} \hat{x}_{ij}} \right]$$

$$v_{kj} \leftarrow v_{kj} \left[ 1 + \frac{\sum_{i,o} z_{ko} t_{ik} tr(E_{ij} W_{io})}{\sum_{i,o} z_{ko} t_{ik} \hat{x}_{ij}} \right].$$

which are the updates to be used for the maximum likelihood estimation of the algorithm parameters by the complex non-negative matrix factorizer 105 in some embodiments and which by definition minimize the model error defined by the squared Frobenius norm given as, $$D_{Euc} = \left\| X_{ij} - \sum_{k=1}^{K} \sum_{o=1}^{O} W_{io} z_{ko} t_{ik} v_{kj} \right\|_F^2$$

In some embodiments the complex non-negative matrix factorizer 105 can further be configured to update or optimize the DSBF kernels. This updating needs a different update scheme to that derived above, since the phase differences of the predefined beamforming kernels are to be retained. In some embodiments the complex non-negative matrix factorizer 105 estimates the DSBF kernel magnitudes by first deriving the update for complex $W_{io}$, but restrict the update to the magnitude only. Thus the model can be seen as magnitude dependent delay and sum beamformer. After the update each spatial covariance matrix is scaled into a unity Frobenius norm by applying $W_{io} \leftarrow W_{io} / \|W_{io}\|$.

The update rule for the spatial covariance matrices $W_{io}$ is obtained via partial derivation of $\mathcal{L}^+(W, Z, T, V\ C)$ resulting in $$\frac{\partial \mathcal{L}^+(\theta)}{\partial W_{io}} = \sum_{j,k} \frac{2}{r_{ijko}}(C_{ijko} - W_{io}z_{ko}t_{ik}v_{kj})(-z_{ko}t_{ik}v_{kj}).$$

Setting the above derivative to zero, substituting $\tau_{ijko}$ With its definition from Sawada et al results in the following update $$\hat{W}_{io} \leftarrow \frac{\sum_{i,j} \hat{x}_{ij} C_{ijko}}{\sum_{j,k} \hat{x}_{ij} z_{ko} t_{ik} v_{kj}}$$

where the $\hat{W}_{io}$ is a preliminary update with a modified phase delay compared to the actual desired update of $W_{io}$. Due to the scaling defined in $$\sum_{o=1}^{O} z_{ko}^2 = 1,$$

$$\sum_{j=1}^{J} v_{kj}^2 = 1,$$

$$\|W_{io}\|_F = 1.$$

the divisor in the above update can be disregarded and substituting $C_{ijko}$ with its definition $$C_{ijko} = W_{io}z_{ko}t_{ik}v_{kj} + r_{ijko}\left(X_{ij} - \sum_{k,o} W_{io}z_{ko}t_{ik}v_{kj}\right)$$

the above update can be modified into the following multiplicative update $$\hat{W}_{io} \leftarrow W_{io}\left[\sum_{j,k} z_{ko}t_{ik}v_{kj}\hat{x}_{ij} + \sum_{j,k} z_{ko}t_{ik}v_{kj}E_{ij}\right].$$

In some embodiments the complex non-negative matrix factorizer 105 can be configured to generate the update of $W_{io}$ by applying $$W_{io} \leftarrow |\hat{W}_{io}|\exp(i\arg(W_{io})), W_{io} \leftarrow W_{io}/\|W_{io}\|.$$

which only updates the magnitude part of the beamforming kernels and thus the magnitudes of the spatial covariance matrices for sources.

The update of $W_{io}$, in particular at the highest frequencies, may produce matrices that are not positive semidefinite, and negative values at the diagonal equals to a subtractive magnitude model, which is not desired. Therefore in some embodiments the complex non-negative matrix factorizer 105 can be configured to enforce positive semidefinite beamkernel matrices by applying an eigenvalue decomposition $W_{io} = VDK^H$ and setting eigencomponents with negative eigenvalues to zero, represented by $\hat{D}$.

The final stage of updating the beamkernels is given as $$W_{io} \leftarrow V\hat{D}V^H$$

Figure 7:
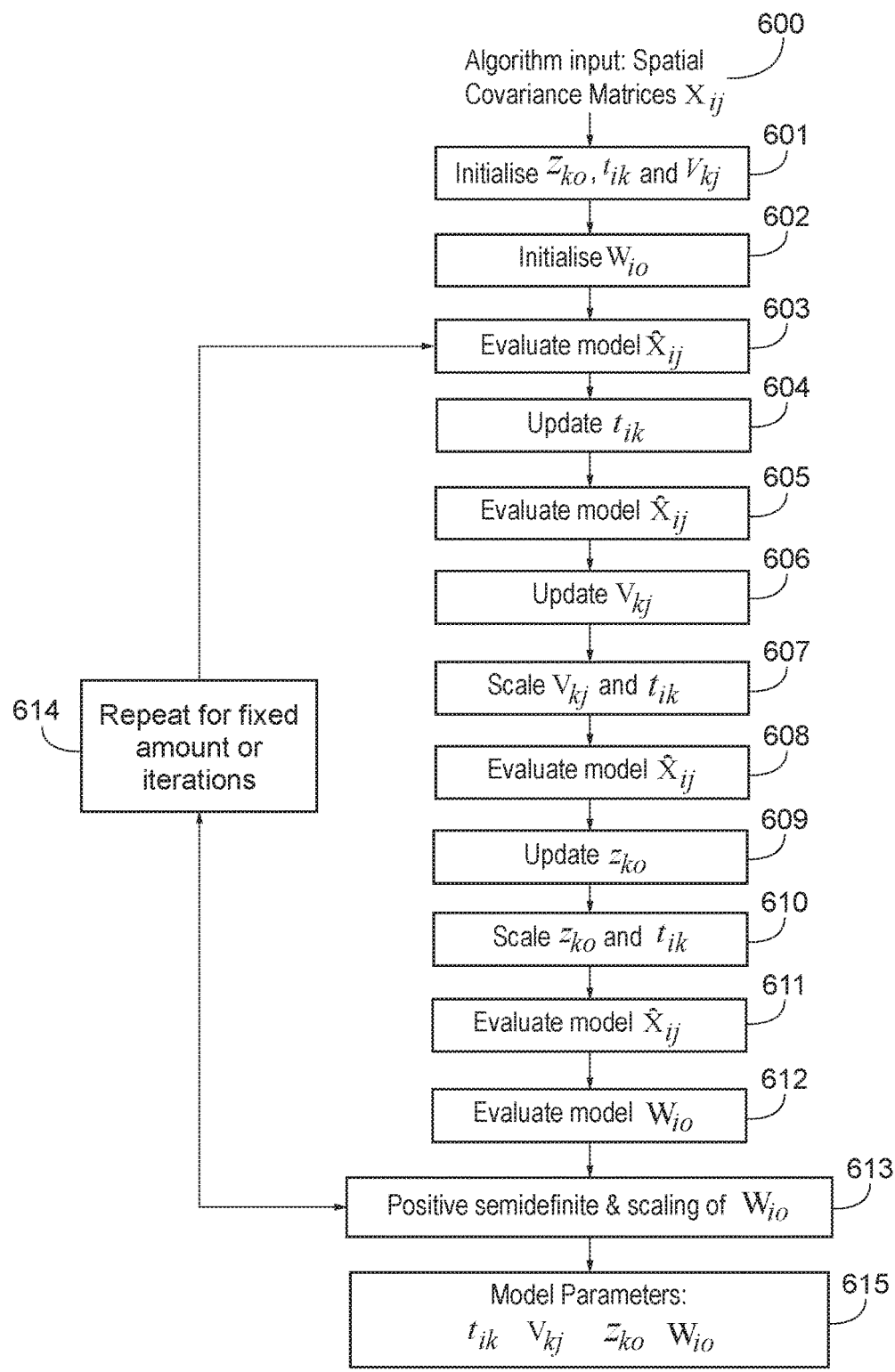
FIG. 7 shows schematically a flow diagram of the operation of parameter estimation according to some embodiments.

The summary of the operation of the beamformer and complex non-negative matrix factorizer 105 can be shown with respect to FIG. 7.

Firstly the complex non-negative matrix factorizer 105 is configured to receive the spatial covariance matrices.

Furthermore the complex non-negative matrix factorizer 105 is configured to initialize $z_{ko}$, $t_{ik}$ and $v_{kj}$ with random values uniformly distributed between zero and one.

The initialization of $z_{ko}$, $t_{ik}$ and $v_{kj}$ with random values uniformly distributed between zero and one is shown in FIG. 7 by step 601.

The beamformer 107 is configured to initialize $W_{io}$ according to $$[W_{io}]_{nm} = W_{nm}(f, k_o) = \exp(j2\pi f \tau_{nm}(k_o)),$$

$$f = \frac{iF_s}{N},$$

and apply $W_{io} \leftarrow W_{io}/\|W_{io}\|$.

The initialization of $W_{io}$ is shown in FIG. 7 by step 60

The complex non-negative matrix factorizer 105 is further configured to recalculate magnitude model $\hat{x}_{ij}$ according to $$\hat{x}_{ij} = \sum_{k,o} z_{ko}t_{ik}v_{kj}$$

The operation of evaluating the magnitude model $\hat{x}_{ij}$ is shown in FIG. 7 by step 603.

The complex non-negative matrix factorizer 105 is further configured to update $t_{ik}$ according to $$t_{ik} \leftarrow t_{ik}\left[1 + \frac{\sum_{j,o} z_{ko}v_{kj}tr(E_{ij}W_{io})}{\sum_{j,o} z_{ko}v_{kj}\hat{x}_{ij}}\right].$$

The operation of updating $t_{ik}$ is shown in FIG. 7 by step 604.

The complex non-negative matrix factorizer 105 is further configured to recalculate magnitude model $\hat{x}_{ij}$ according to $$\hat{x}_{ij} = \sum_{k,o} z_{ko}t_{ik}v_{kj}.$$

The operation of recalculating the magnitude model $\hat{x}_{ij}$ is shown in FIG. 7 by step 605.

The complex non-negative matrix factorizer 105 is further configured to update $v_{kj}$ according to $$v_{kj} \leftarrow v_{kj}\left[1 + \frac{\sum_{i,o} z_{ko}t_{ik}tr(E_{ij}W_{io})}{\sum_{i,o} z_{ko}t_{ik}\hat{x}_{ij}}\right].$$

The operation of updating $v_{kj}$ is shown in FIG. 7 by step 606.

The complex non-negative matrix factorizer 105 is further configured scale $v_{kj}$ to unity $l^2$-norm and compensate by rescaling $t_{ik}$ as specified in $$v_{kj} \leftarrow \frac{v_{kj}}{\sum_{j=1}^{J} v_{kj}^2},$$

$$t_{ik} \leftarrow \frac{t_{ik}}{\sum_{j=1}^{J} v_{kj}^2}.$$

The operation of scaling $v_{kj}$ and $t_{ik}$ is shown in FIG. 7 by step 607.

The complex non-negative matrix factorizer 105 is further configured to recalculate magnitude model $\hat{x}_{ij}$ according to $$\hat{x}_{ij} = \sum_{k,o} z_{ko} t_{ik} v_{kj}.$$

The operation of recalculating $\hat{x}_{ij}$ is shown in FIG. 7 by step 608.

The complex non-negative matrix factorizer 105 is further configured to update $z_{ko}$ according to $$z_{ko} \leftarrow z_{ko}\left[1 + \frac{\sum_{i,j} t_{ik} v_{kj} tr(E_{ij} W_{io})}{\sum_{i,j} t_{ik} v_{kj} \hat{x}_{ij}}\right].$$

The operation of updating $z_{ko}$ is shown in FIG. 7 by step 609

The complex non-negative matrix factorizer 105 is further configured to scale $z_{ko}$ to $l^2$-norm and compensate by rescaling $t_{ik}$ as specified in $$z_{ko} \leftarrow \frac{z_{ko}}{\sum_{o=1}^{O} z_{ko}^2},$$

$$t_{ik} \leftarrow \frac{t_{ik}}{\sum_{o=1}^{O} z_{ko}^2}.$$

The operation of scaling $z_{ko}$ and $t_{ik}$ is shown in FIG. 7 by step 610.

The complex non-negative matrix factorizer 105 is further configured to recalculate magnitude model $\hat{x}_{ij}$ according to $$\hat{x}_{ij} = \sum_{k,o} z_{ko} t_{ik} v_{kj}.$$

The operation of recalculating $\hat{x}_{ij}$ is shown in FIG. 7 by step 611, The complex non-negative matrix factorizer 105 is further configured to update $W_{io}$ according to $$\hat{W}_{io} \leftarrow W_{io}\left[\sum_{j,k} z_{ko} t_{ik} v_{kj} \hat{x}_{ij} + \sum_{j,k} z_{ko} t_{ik} v_{kj} E_{ij}\right].$$

and $W_{io} \leftarrow |\hat{W}_{io}|\exp(i \arg(W_{io}))$, $W_{io} \leftarrow W_{io}/\|W_{io}\|$.

The operation of updating $W_{io}$ is shown in FIG. 7 by step 612.

The complex non-negative matrix factorizer 105 is further configured to enforce $W_{io}$ to be positive semidefinite by $W_{io} \leftarrow V\hat{D}V^H$ and apply $W_{io} \leftarrow W_{io}/\|W_{io}\|$.

The operation of enforcing enforces $W_{io}$ to be positive semidefinite is shown in FIG. 7 by step 613.

The complex non-negative matrix factorizer 105 is further configured to repeat steps 603 to 613 for a determined number of iterations or until the parameter updates converge and do not change significantly between updates.

The operation of performing the looping back to step 603 is shown in FIG. 7 by step 614.

Furthermore in some embodiments the complex non-negative matrix factorizer 105 is further configured to output the model parameters.

The generation or outputting of the model parameters $t_{ik}$ $v_{kj}$ $z_{ko}$ $W_{io}$ is shown in FIG. 7 by step 615.

In some embodiments the model parameters are output to the separator 109.

The operation of performing complex non-negative matrix factorization with beam kernels is shown in FIG. 3 by step 307.

In some embodiments the apparatus comprises a separator 109. The separator 109 in some embodiments is configured to receive the CNMF components and the array input and to separate the audio signals into individual sources.

Figure 8:
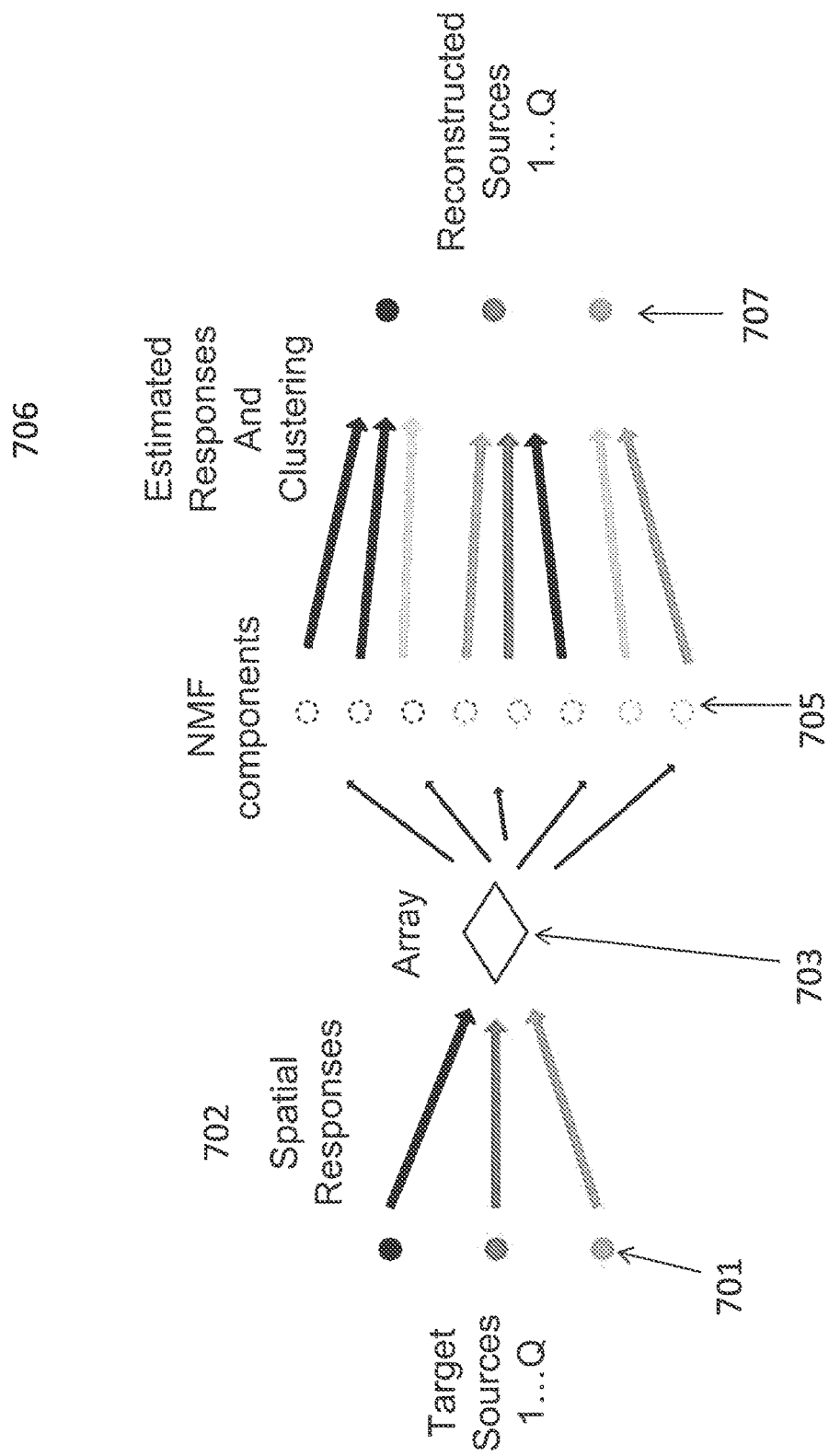
FIG. 8 shows schematically the general principle of the clustering of CNMF components based on spatial weights according to some embodiments.

The separation to real acoustic sources therefore requires clustering the complex value non-negative matrix factorized (CNMF) components that were earlier interpreted as individual sources. In other word take the fixed spectral bases of CNMF components and restrict them to model only parts of the real sources. The CNMF components originating from the same source share very similar spatial covariance properties determined by the spatial weights $z_{ko}$. This is illustrated in FIG. 8 where it is shown that the target sources 1: Q 701 spatial responses 702 are reflected in the array 703 which as described herein is factorized into NMF components 705 which are estimated and clustered 706 to generate the estimated or reconstructed sources 1: Q 707. In some embodiments the clustering is based on the spatial weight similarity and separate clustering algorithms can be used for solving the CNMF component associations to actual acoustic sources mapping.

In the following examples k-means clustering applied on the spatial weights $z_{ko}$ are used for testing and evaluating the separation quality. In such embodiments the separator 109 is configured so that each $z_k$, acts as a feature vector and k-means clustering is applied with the desired cluster count being equal to the total number of original sound sources Q. In such embodiments from the k-means clustering a cluster decision is reached that component k belongs to a source q and the cluster decision is denoted by binary parameter $b_{qk}$. The CNMF magnitude model for a single source magnitude spectrogram can be then defined as $$s_{ijq} = \sum_{ko} b_{qk} z_{ko} t_{ik} v_{kj}$$

It would be understood that in some embodiments any other clustering algorithm or CNMF component to source linking strategy can be used to estimate either a binary or a soft decision $b_{qk}$ and the choice to use the k-means clustering applied on the spatial weights is an example to demonstrate the CoA, analysis and modelling performance of the proposed embodiments.

In some embodiments other features from the CNMF parameters, such as spectral similarity and gain behaviour over time, can be used in parallel for associating the CNMF components to the sources.

The separator 109 in some embodiments is configured to output the clustered sources to a spatial synthesizer 111.

The operation of separation of the sources into clusters is shown in FIG. 3 by step 309.

In some embodiments the apparatus comprises a spatial synthesizer 111. The spatial synthesizer 111 is configured to receive the clustered source parameters to regenerate the source signals. In some embodiments the reconstruction of the source signals employs a Wiener filter. In such embodiments the source reconstruction filtering is given with the CNMF component clustering decision $b_{kk}$ as, $$y_{ijq} = x_{ij} \frac{\sum_{ko} b_{qk} z_{ko} t_{ik} v_{kj}}{\sum_{qko} b_{qk} z_{ko} t_{ik} v_{kj}}$$

where $y_{ijq}$ are now in the role of the real acoustic sources. The time-domain sources are obtained from inverse STFT (iSTFT).

Figure 9:
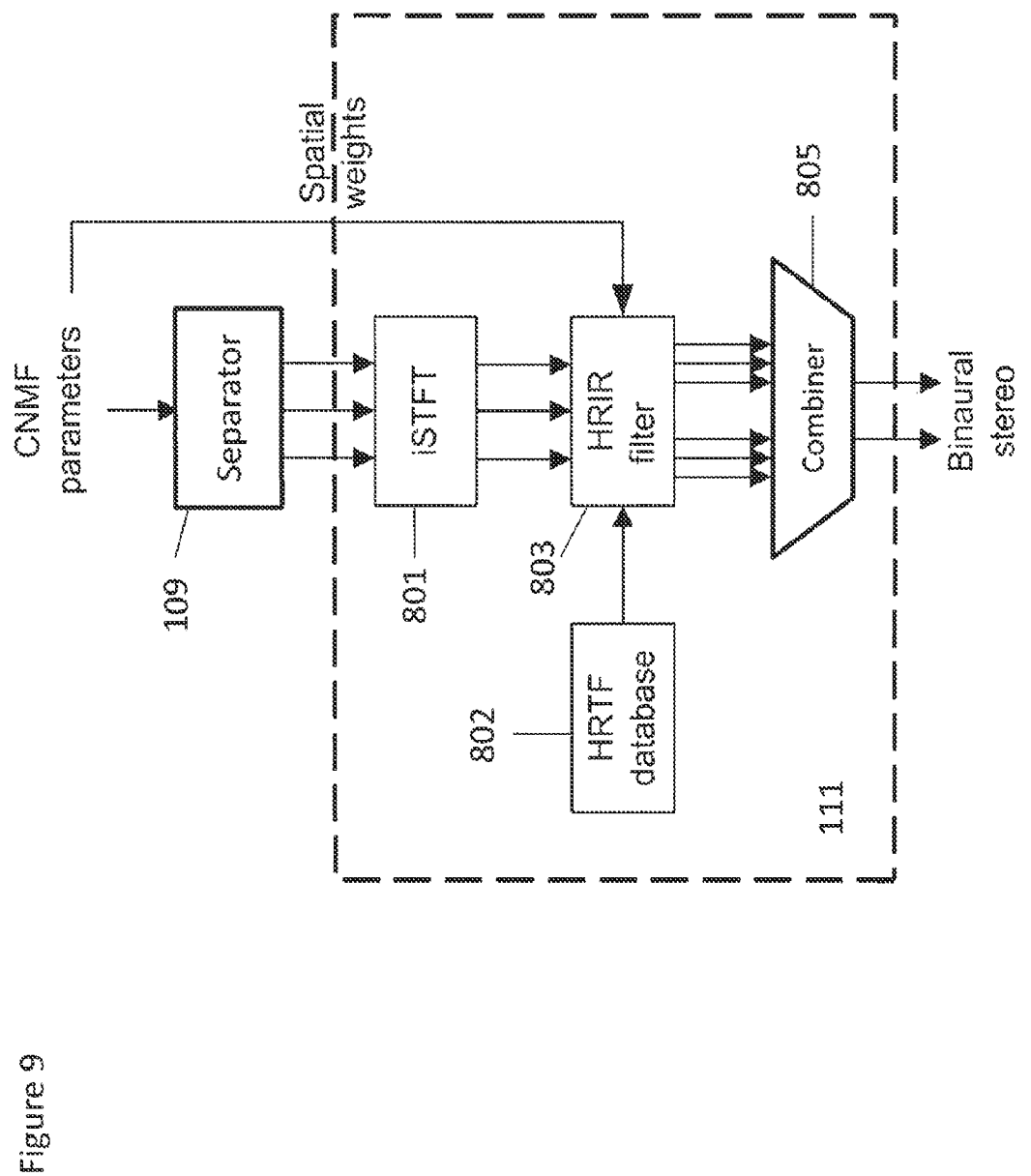
FIG. 9 shows schematically the spatial synthesiser as shown in FIG. 2 configured to generate a binaural output according to some embodiments.

With respect to FIG. 9 an example spatial synthesizer 111 according to some embodiments is shown. Furthermore with respect to FIG. 10 the operation of the spatial synthesizer shown in FIG. 9 is shown.

In some embodiments the spatial synthesizer 111 comprises an inverse short time Fourier transformer (iSTFT) 801 configured to apply an inverse short time Fourier transform to the clustered CNMF parameters output by the separator 109.

The inverse short time Fourier transformed parameters are in some embodiments output to a head related impulse response (HRIR) filter 803.

Figure 10:
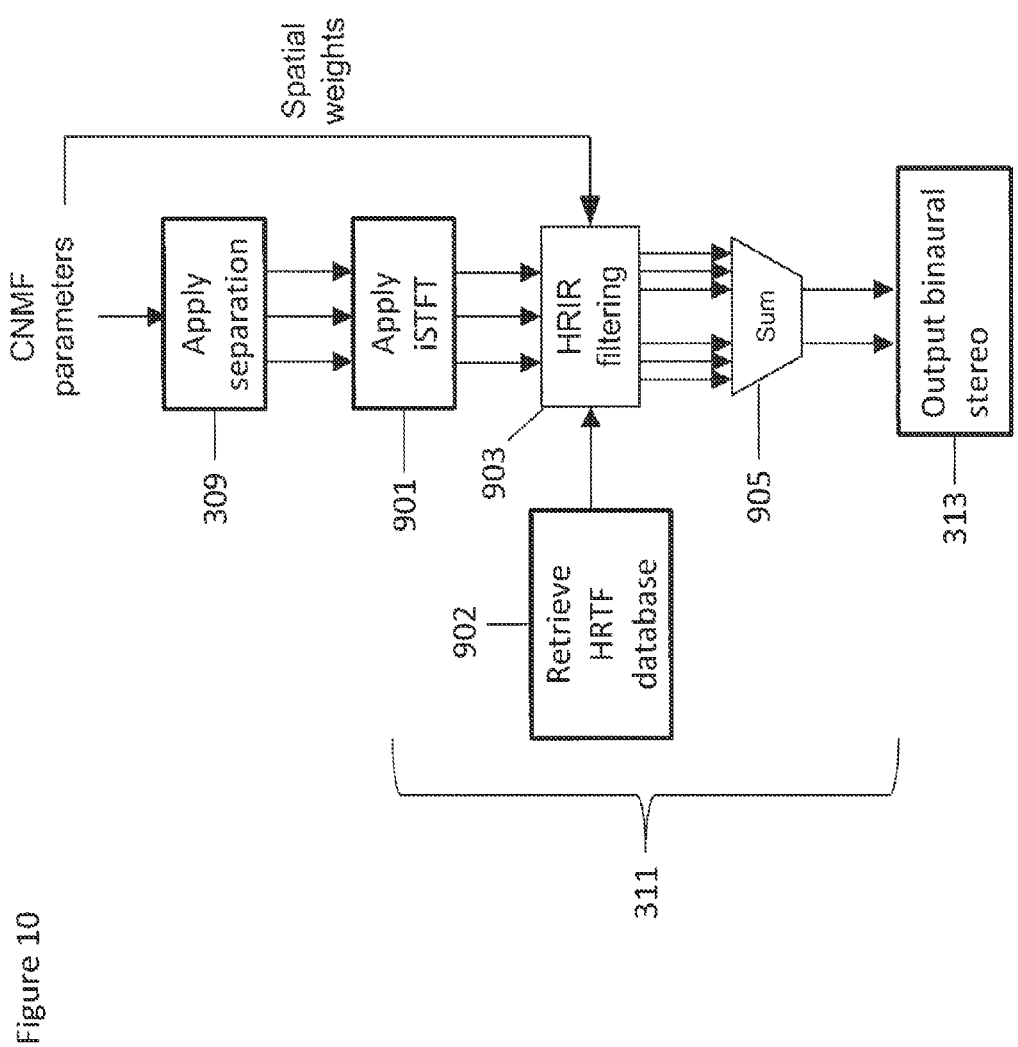
FIG. 10 shows schematically a flow diagram showing the operation of the spatial synthesiser as shown in FIG. 9 configured to generate a binaural output according to some embodiments.

The operation of applying an iSTFT to the clustered CNMF parameters is shown in FIG. 10 by step 901.

In some embodiments the apparatus comprises a HRIR filter 803 configured to receive the iSTFT clustered CNMF parameters.

Furthermore in some embodiments the HRIR filter 803 is configured to receive original STFT observations $x_{ij}$ and construct a Wiener-filter from the CNMF magnitude model parameters to filter out the source spectral details in STFT domain. The source reconstruction filtering is given in some embodiments as, $$y_{ijk} = x_{ij} \frac{\sum_{o} z_{ko} t_{ik} v_{kj}}{\sum_{ko} z_{ko} t_{ik} v_{kj}}$$

where $y_{ijk}$ are the estimated source signals as seen by the array (in other words convolved with their spatial impulse response and $x_{ij}$ is the STFT of the mixture signals captured by the array).

The time-domain signals are obtained in some embodiments from the iSTFT 801.

In some embodiments the HRIR filter 803 is configured to chosen as the dominant source direction the direction determined by the beams with the highest power and a single HRTF filter associated with this direction used.

In some embodiments other binaural spatial synthesis schemes can be employed, for example using several dominant directions in HRIR filtering stages for each source.

In some embodiments the spatial synthesizer 111 comprises a HRTF database configured to store the retrieved HRIR filter components.

The operation of retrieving the HRIR filter components from the HRTF database is shown in FIG. 10 by step 902.

In the following examples the binaural synthesis accuracy was determined in informal testing as source positioning was determined to resemble the actual positioning of the sources.

Figure 11:
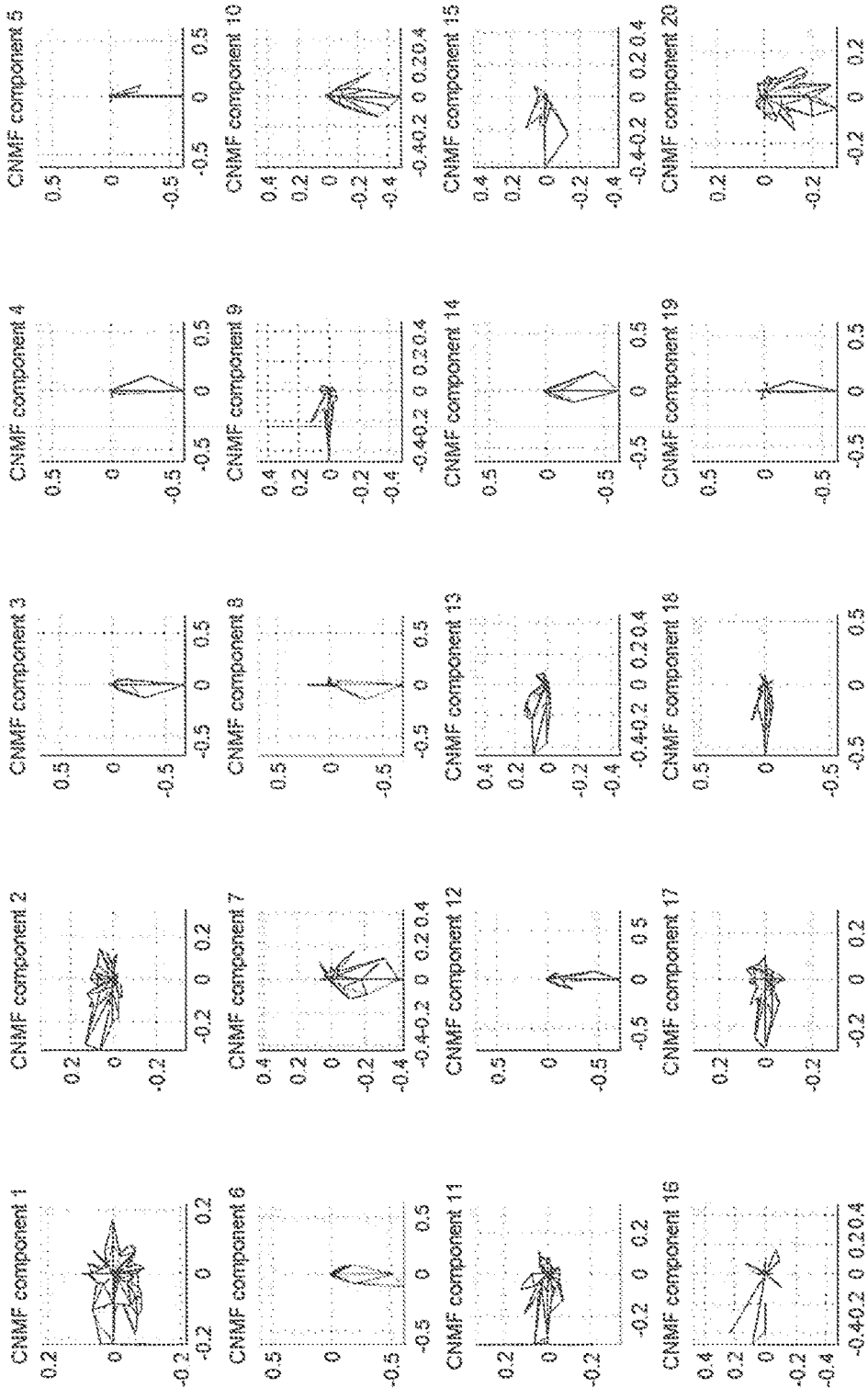
FIG. 11 shows graphical plots of spatial weights analysed by an example of some embodiments as pictured from above the array where original source positioning was on the lateral plane at azimuths 0 (left) and 90 (bottom) degrees.

One example of the spatial weights analysed by the model is given in FIG. 11. The original positions are 0 and 90 degrees with zero elevation which can be clearly seen from the analysed weights which produced both good separation and accurate spatial synthesis using the binaural synthesis scheme.

In some embodiments the individual spatial covariance for each CNMF component is interpreted as the direction of a single source and the CNMF component can be directly used for the spatial synthesis. In case where only 3D sound synthesis is desired, no separation stage is needed but each CNMF component is synthesized individually and they are positioned to their analysed spatial location with one of the above defined spatial sound field synthesis approaches.

In some embodiments the associated spatial weights are used to determine which HRTFs are used in form of head related impulse response (HRIR) to filter the separated sources. This simulates source positioning by binaural cues such as time-difference of arrival and direction dependent frequency filter caused by the pinna.

The operation of HRIR filtering is show in FIG. 10 by 903.

In some embodiments the HRIR filter is configured to output the filtered components to a combiner 805.

In some embodiments the spatial synthesizer 111 comprises a combiner 805 configured to sum or combine the HRIR filter sources. In other words in some embodiments after each source is filtered with its associated direction dependent binaural filter (HRIR) all the individual sources are summed together to form a binaural synthesis signal.

The operation of combining (sum) the filter source is shown in FIG. 10 by step 905.

It would be understood that any other spatial sound field synthesis technique based on knowing source signals and their multidimensional source positioning can be used. For example in some embodiments the spatial sound field synthesis can be performed by vector base amplitude panning.

The operation of outputting an output (for example a binaural stereo output) is shown in FIGS. 3 (and 9) by step 313.

In some embodiments sparsity can be enforced to the directional weights $z_{ko}$ which can be used to guide the algorithm to find spatial covariances for sources that have point-like nature and do not include ambient content in form of reverberation. In some embodiments this can be employed to decrease the cross-talk between the separated sources. In such embodiments the $l^2$-norm scaling of $z_{ko}$ specified in $$\sum_{o=1}^{O} z_{ko}^2 = 1,$$

$$\sum_{j=1}^{J} v_{kj}^2 = 1,$$

$$\|W_{io}\|_F = 1.$$

is defined in such way that a sparsity cost $\Sigma_p z_{ko}$ can be used.

Furthermore in some embodiments the CNMF component association to sources can be estimated directly. In such embodiments the clustering decision $b_{qk}$ is a non-negative parameter that can be included in the model and an update rule based on the partial derivation can be obtained. In these embodiments the SCMs are estimated with respect to each real acoustic sound source and similarly to the presented model the frequency dependency using DSBFs is maintained.

In the following the separation performance of some embodiments is demonstrated by comparing the results of embodiments against conventional BSS methods suitable for the particular case of small microphone array captures with a reasonable amount of reverberation. The separation performance is determined by the separation quality measures, the signal-to-distortion ratio (SDR), image-to-spatial distortion ratio (ISR), signal-to-interference ratio (SIR) and signal-to-artifact ratio (SAFE) such as provided by a BSS Eval toolbox In the following examples the separation evaluation is performed using impulse responses recorded in a regular meeting room from various directions. The impulse responses of each source location to the microphone array were obtained using maximum length sequence (MLS) method and using Genelec 1029A speakers for the MLS excitation. The anechoic test samples were convolved with the impulse responses and summed together to simulate sources that are captured simultaneously. The sampling frequency used was 48 kHz, the room dimensions were approximately 5×12×2.59 m and the reverberation time (T60) was approximately 0.35s. The capture array in the following examples consists of four DPA 4060-BM prepolarized omnidirectional miniature condensator microphones. The array dimensions are given by the following table

Figure 12:
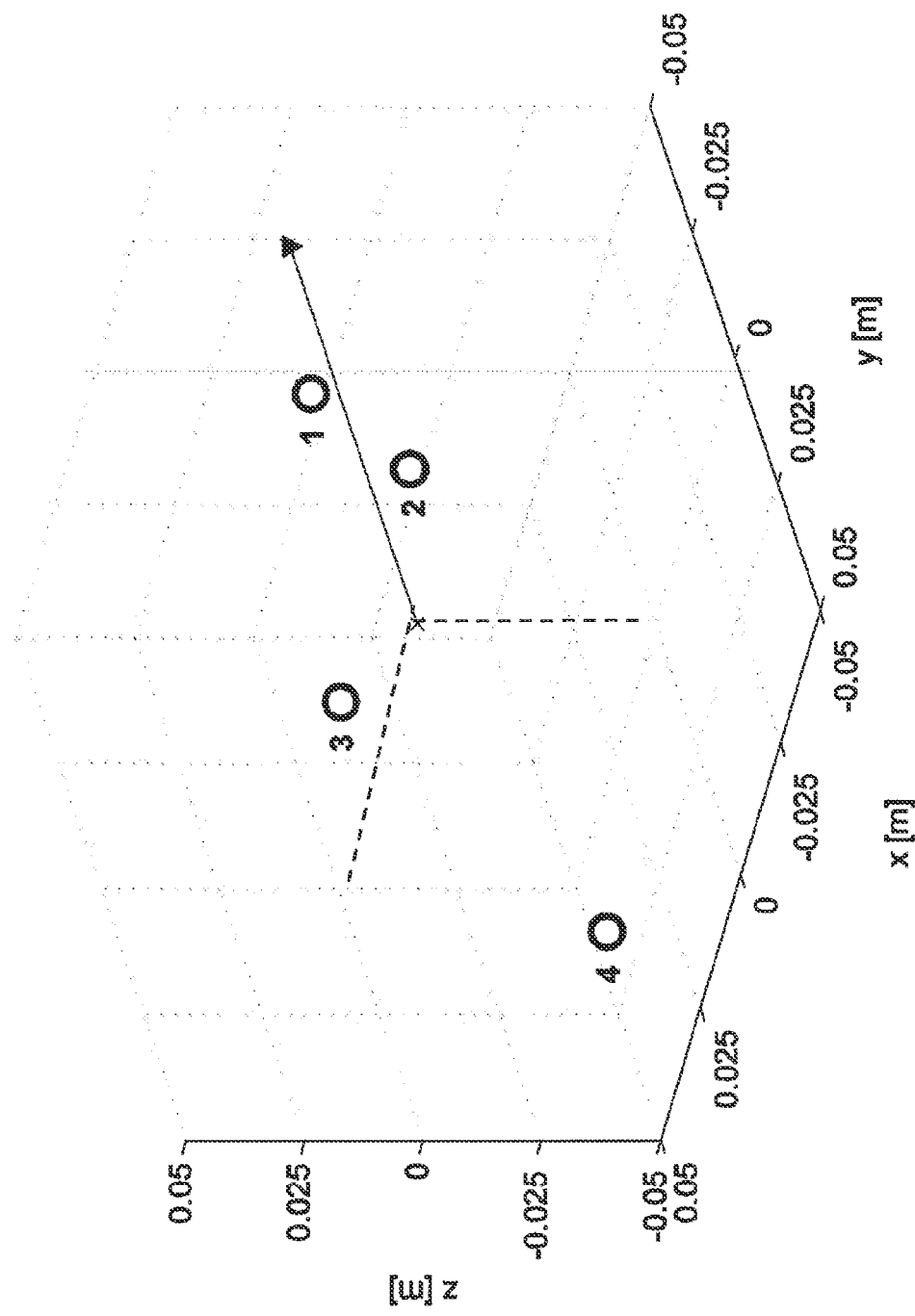
FIG. 12 shows a graphical plot of an example capturing array of microphones used in some embodiments where microphones are denoted by circles and the zero angle references axis by an arrow.

| Mic | x (mm) | y (mm) | z (mm) |
| --- | --- | --- | --- |
| 1 | 0 | −46 | 6 |
| 2 | −22 | −8 | 6 |
| 3 | 22 | −8 | 6 |
| 4 | 0 | 61 | −18 | and the array geometry with reference axis is illustrated in FIG. 12.

The spatial aliasing frequency for the given array is 1563 Hz.

The signal length for the embodiments following examples to analyze was set to 10 seconds in each test case, the STFT window length was 2048 samples with 50% window overlap. The determined number of iterations for non-negative matrix factorization in the following examples was 200 iterations. Furthermore for the following examples the impulse responses were captured from following angles [0, 45, 90, 135, 180, 305] of which a several combinations with different source types (speech, music and noise) were chosen for the evaluation. After convolving the impulse responses the signals were downsampled to 24 kHz. The spatial sampling defined by all look direction vectors for different DSBFs are illustrated in FIG. 6 which comprises 110 beam directions which approximately uniformly sample the unit sphere surface around the array. In this example the lateral resolution at zero elevation, in other words at the flat surface of the array, is 10 degrees and the different elevations are at 22.5 degrees spacing. The azimuth resolution in such embodiments is decreased close to the poles of the unit sphere. The separation performance was compared to the CNMF method proposed herein.

In all the following test cases a total of five 10 second signals were tested and separation measures were averaged over all test signals and all sources within the test case.

Figure 13:
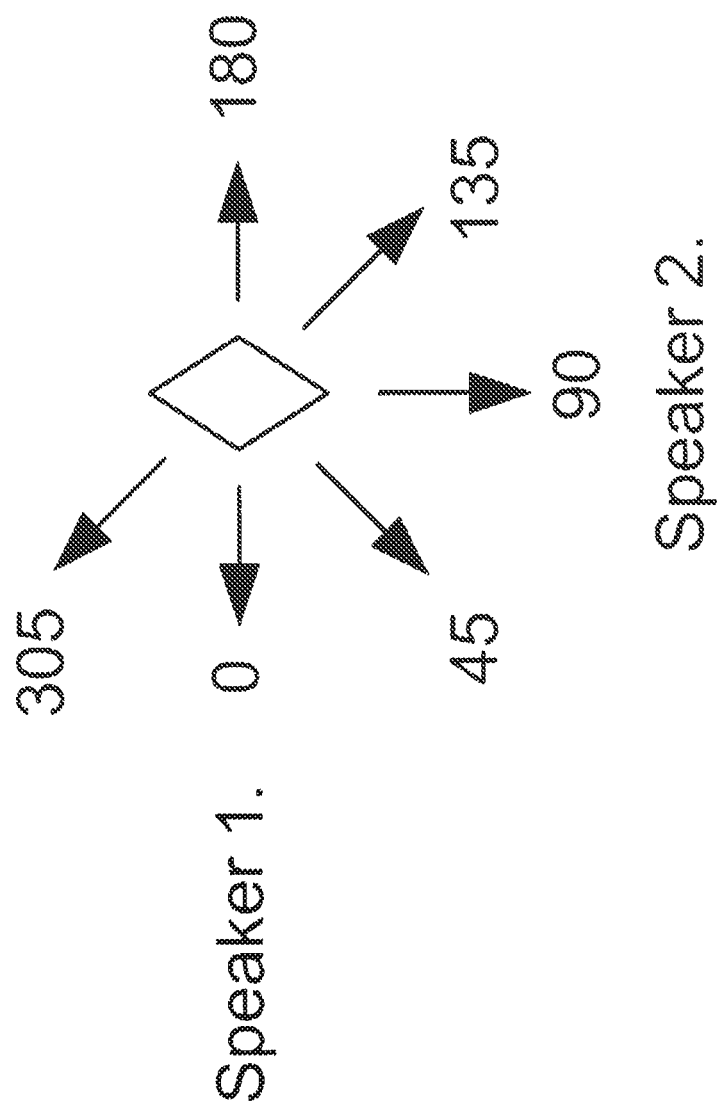
FIG. 13 shows a graphical plot of source positioning in embodiment example 1.

In the first test case two speakers with 90 degrees spacing were tested. The source positioning is illustrated in FIG. 13 (speaker 1 at 0 degrees and speaker 2 at 90 degrees) and the separation results are given by the following table

|  | Reference | Embodiment Example 1 |
| --- | --- | --- |
| SDR (dB) | 3.20 | 7.48 |
| ISR (dB) | 7.69 | 12.45 |
| SIR (dB) | 4.19 | 11.11 |
| SAR (dB) | 10.70 | 11.09 |

Figure 14:
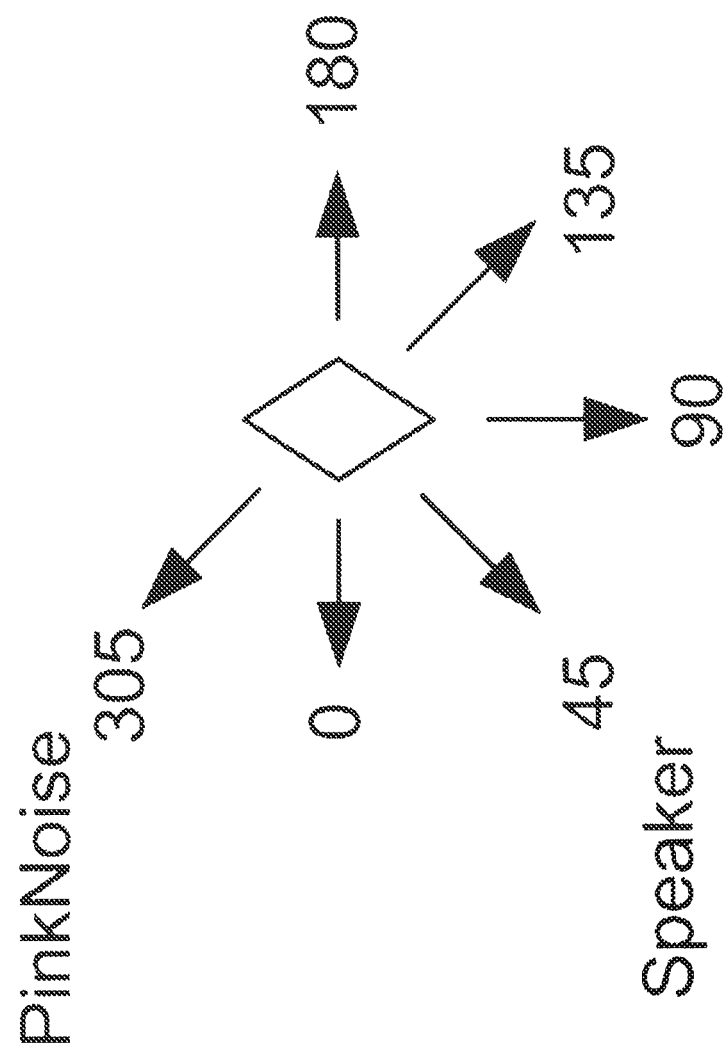
FIG. 14 shows a graphical plot of source positioning in embodiment example 2.

In a second test case a combination of a speaker and an artificial pink noise source with 90 degrees spacing was tested from different angles (speaker at 45 degrees and pink noise from 135 degrees). The source positioning is illustrated in FIG. 14 and the separation results are given in the following table

|  | Reference | Embodiment Example 2 |
| --- | --- | --- |
| SDR (dB) | 3.75 | 5.06 |
| ISR (dB) | 7.95 | 9.30 |
| SIR (dB) | 4.03 | 6.57 |
| SAR (dB) | 10.52 | 9.38 |

Figure 15:
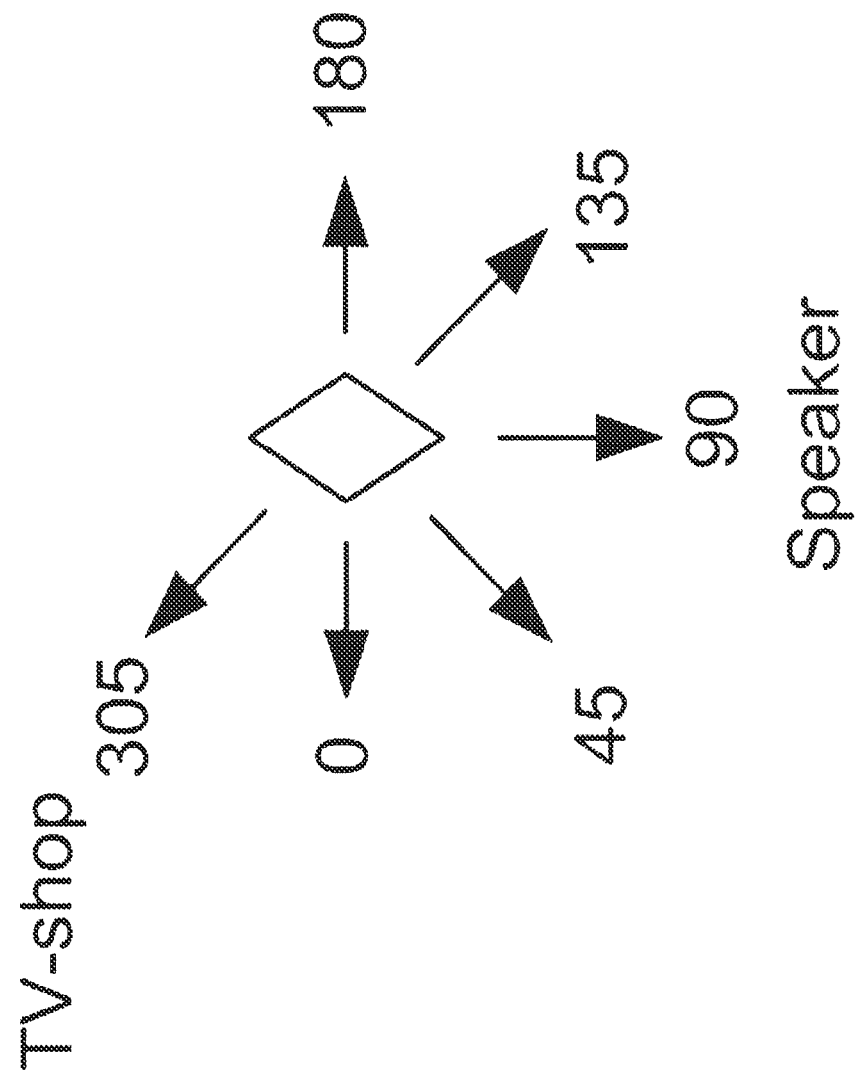
FIG. 15 shows a graphical plot of source positioning in embodiment example 3.

In the third test case one speaker and a television broadcast with a 145 degree spacing was tested. The source positioning is illustrated in FIG. 15 (TV source at 305 degrees and speaker at 90 degrees) and the separation results are given in the following table

|  | Reference | Embodiment Example 3 |
| --- | --- | --- |
| SDR (dB) | 3.50 | 4.69 |
| ISR (dB) | 7.30 | 10.54 |
| SIR (dB) | 3.45 | 8.51 |
| SAR (dB) | 10.28 | 9.55 |

It would be understood that the achieved separation performance indicates that the embodiments as shown in the example beamforming based spatial covariance matrix estimation for source separation systematically increases the separation compared to the reference that is also based on spatial covariance estimation. Furthermore it would be understood that the separation performance improvement is greatest with speech sources with significant azimuth difference and decreases with difficult broadband noises such as artificial pink noise.

It would be understood that although the following examples show the operations capturing audio signals, analysis of the audio signal to generate modelled audio sources, and regeneration of the audio signals from the modelled audio sources in some embodiments the apparatus and for example the spatial synthesizer can be configured to process the modelled audio sources according to any suitable means.

Figure 16:
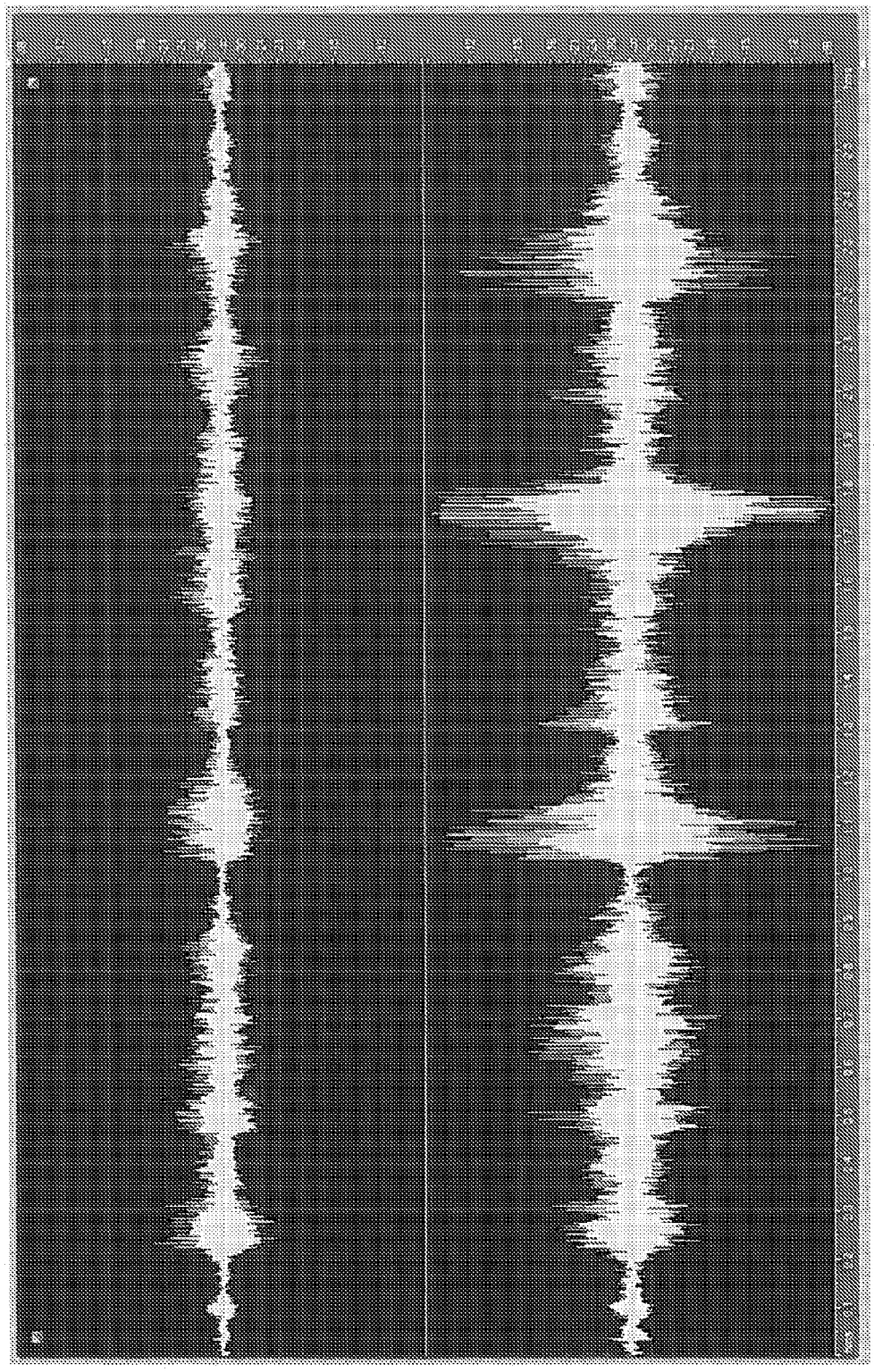
FIGS. 16 and 17 show graphical plots of example outputs generated by source processing according to some embodiments.
Figure 17:
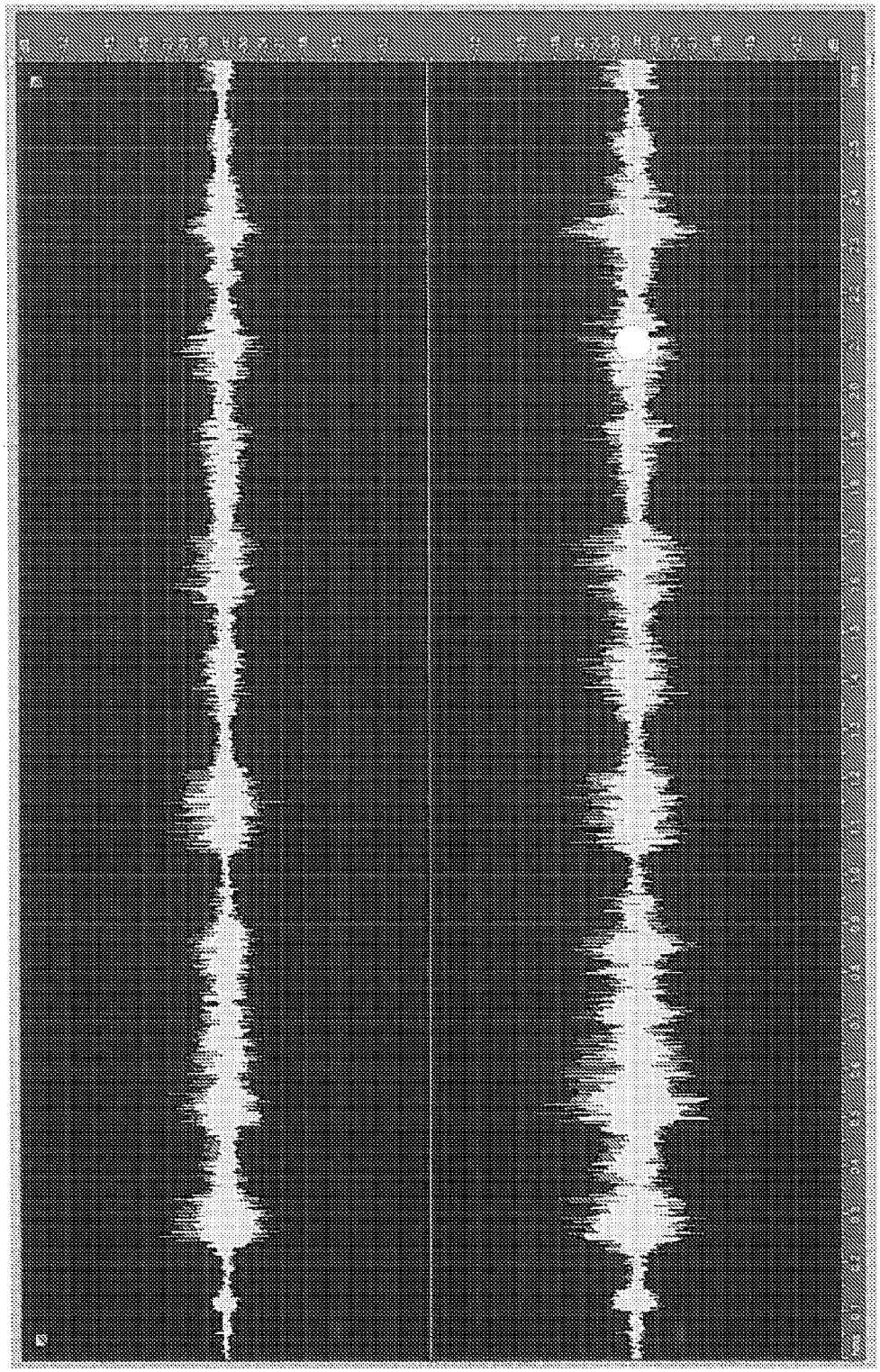

For example as shown in FIGS. 16 and 17 an example processing is shown wherein in FIG. 16 an example of a male speaker and two other speakers are present. In this example the microphones are omnidirectional and all speakers are present in both channels. However the male speaker is to the right of the microphone array and therefore his voice is dominant in the right channel (right channel=the lower of the two channels). In FIG. 17, the graph shows where the male speaker is removed by removing the audio source estimated according to the embodiments described herein. In such embodiments as can be seen the male speaker is attenuated by approximately 12 dB in the right channel without affecting the sound from other speakers that dominate the left channel.

It shall be appreciated that the term user equipment is intended to cover any suitable type of wireless user equipment, such as mobile telephones, portable data processing devices or portable web browsers, as well as wearable devices.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for separating audio sources comprising:
   receiving at least two audio signals;
   transforming the at least two audio signals into a frequency domain representation of the at least two signals;
   generating an observed spatial covariance matrix from the frequency domain representations of the at least two audio signals;
   generating a spatial covariance matrix model comprising at least one beamformer kernel;
   generating a linear magnitude model of audio objects;
   combining the spatial covariance matrix model and the linear magnitude model;
   determining at least one combination parameter, such that the at least one parameter for the combination attempts to optimise the combination; and
   clustering the audio objects based on the at least one combination parameter to create separated audio sources.

2. The method as claimed in claim 1, wherein receiving the at least two audio signals comprises at least one of:
   receiving the audio signals being generated from microphones receiving acoustic waves from at least one audio source; and
   receiving the audio signals being received from a memory, the audio signals describing acoustic waves from at least one audio source.

3. The method as claimed in claim 1, wherein transforming the at least two audio signals into a frequency domain representation of the at least two signals comprises performing a time to frequency transform on the at least two audio signals.

4. The method as claimed in claim 1, wherein generating the observed spatial covariance matrix from the frequency domain representations of the at least two audio signals comprises generating an observed spatial covariance matrix from an autocovariance of the two frequency domain representations.

5. The method as claimed in claim 1, further comprising generating at least one beamformer kernel by generating an autocovariance of time delays in a frequency domain of a set of look directions sampling the spatial space around the microphone array.

6. The method as claimed in claim 1, wherein generating a linear model of audio objects comprises performing a non-negative matrix factorization for audio object magnitudes.

7. The method as claimed in claim 6, wherein performing a non-negative matrix factorization for audio object magnitudes comprises initialising linear model parameters $z_{ko}, t_{ik}$ and $v_{kj}$ with random values uniformly distributed between zero and one.

8. The method as claimed in claim 1, wherein combining spatial covariance matrix model and the linear magnitude model, comprises multiplying the spatial covariance matrix model by a magnitude envelope represented by the linear model.

9. The method as claimed in claim 1, wherein determining at least one combination parameter comprises determining spatial covariance model parameters to minimize the difference between the observed spatial covariance matrix and the spatial covariance model.

10. The method as claimed in claim 9, wherein determining the spatial covariance model parameters comprises performing an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

11. The method as claimed in claim 10, wherein performing the iterative optimization based on the complex value non-negative factorization comprises:
updating linear model parameters $z_{ko}$, $t_{ik}$ and $v_{kj}$ according to an optimization framework of complex non-negative matrix factorization; and
updating the spatial covariance matrix model magnitudes.

12. The method as claimed in claim 7, wherein clustering the audio objects based on the at least one combination model parameter to create separated audio sources comprises generating at least one audio source from the at least one audio object and from the estimated linear magnitude model parameters.

13. An apparatus comprising at least one processor and at least one memory including computer code for one or more programs, the at least one memory and the computer code configured to with the at least one processor cause the apparatus to at least:
receive at least two audio signals;
transform the at least two audio signals into a frequency domain representation of the at least two signals;
generate an observed spatial covariance matrix from the frequency domain representations of the at least two audio signals;
generate a spatial covariance matrix model comprising at least one beamformer kernel;
generate a linear magnitude model of audio objects;
combine the spatial covariance matrix model and the linear magnitude model;

determine at least one combination parameter, such that the at least one parameter for the combination attempts to optimise the combination; and
clustering the audio objects based on the at least one combination parameter to create separated audio sources.

14. The apparatus as claimed in claim 13, wherein the apparatus caused to receive the at least two audio signals causes the apparatus to perform at least one of:
receive the audio signals being generated from microphones receiving acoustic waves from at least one audio source; and
receive the audio signals from a memory, the audio signals describing acoustic waves from at least one audio source.

15. The apparatus as claimed in claim 13, wherein the apparatus caused to transform the at least two audio signals into a frequency domain representation of the at least two signals causes the apparatus to perform a time to frequency transform on the at least two audio signals.

16. The apparatus as claimed in claim 13, wherein the apparatus caused to generating the observed spatial covariance matrix from the frequency domain representations of the at least two audio signals causes the apparatus to generate an observed spatial covariance matrix from an autocovariance of the two frequency domain representations.

17. The apparatus as claimed in claim 13, wherein the apparatus is further caused to generate at least one beamformer kernel by generating an autocovariance of time delays in a frequency domain of a set of look directions sampling the spatial space around the microphone array.

18. The apparatus as claimed in claim 13, wherein the apparatus caused to generate a linear model of audio objects causes the apparatus to perform a non-negative matrix factorization for audio object magnitudes.

19. The apparatus as claimed in claim 18, wherein the apparatus caused to perform the non-negative matrix factorization for audio object magnitudes causes the apparatus to initialise linear model parameters $z_{ko}$, $t_{ik}$ and $v_{kj}$ with random values uniformly distributed between zero and one.

20. The apparatus as claimed in claim 13, wherein the apparatus caused to combine spatial covariance matrix model and the linear magnitude model causes the apparatus to multiply the spatial covariance matrix model by a magnitude envelope represented by the linear model.

21. The apparatus as claimed in claim 13, wherein the apparatus caused to determine at least one combination parameter causes the apparatus to determine spatial covariance model parameters to minimize the difference between the observed spatial covariance matrix and the spatial covariance model.

22. The apparatus as claimed in claim 21, wherein the apparatus caused to determine the spatial covariance model parameters causes the apparatus to perform an iterative optimization based on a complex-valued non-negative matrix factorization, such that the parameters of the linear magnitude model representing the at least one audio object are iteratively updated until either the linear magnitude model parameters do not change significantly between updates or a defined number of iterations are processed.

23. The apparatus as claimed in claim 22, wherein the apparatus caused to perform the iterative optimization based on the complex value non-negative factorization causes the apparatus to:

update linear model parameters $z_{ko}$, $t_{ik}$ and $v_{kj}$ according to an optimization framework of complex non-negative matrix factorization; and update the spatial covariance matrix model magnitudes.

24. The apparatus as claimed in claim 19, wherein the apparatus caused to cluster the audio objects based on the at least one combination model parameter to create separated audio sources causes the apparatus to generate at least one audio source from the at least one audio object and from the estimated linear magnitude model parameters.

* * * * *